United States Patent
Zhu et al.

(10) Patent No.: US 11,690,058 B2
(45) Date of Patent: Jun. 27, 2023

(54) SYNCHRONIZATION OF TRAFFIC AND DISCONTINUOUS RECEPTION AND/OR SEMIPERSISTENT SCHEDULING

(71) Applicant: QUALCOMM Incorporated, San Diego, CA (US)

(72) Inventors: Xipeng Zhu, San Diego, CA (US); Gavin Bernard Horn, La Jolla, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 16/890,747

(22) Filed: Jun. 2, 2020

(65) Prior Publication Data

US 2020/0383127 A1    Dec. 3, 2020

Related U.S. Application Data

(60) Provisional application No. 62/856,503, filed on Jun. 3, 2019.

(51) Int. Cl.
*H04W 72/12* (2023.01)
*H04W 76/28* (2018.01)
*H04W 72/23* (2023.01)

(52) U.S. Cl.
CPC .......... *H04W 72/12* (2013.01); *H04W 76/28* (2018.02); *H04W 72/23* (2023.01)

(58) Field of Classification Search
CPC ............. H04W 72/1205; H04W 76/28; H04W 72/1289; H04W 72/1242; H04W 40/005;
(Continued)

(56) References Cited

U.S. PATENT DOCUMENTS

| | | | |
|---|---|---|---|
| 2007/0129072 A1* | 6/2007 | Yamato | H04W 4/029 455/436 |
| 2014/0056229 A1* | 2/2014 | Li | H04W 76/19 370/329 |

(Continued)

FOREIGN PATENT DOCUMENTS

| | | |
|---|---|---|
| EP | 3397014 A1 | 10/2018 |
| WO | 2015191225 A1 | 12/2015 |
| WO | WO-2015191225 A1 * | 12/2015 ............ H04W 76/28 |

OTHER PUBLICATIONS

Apple Inc : "UE Power Saving Techniques", 3GPP Draft, 3GPP TSG-RAN WG1 Meeting #96, R1-1902771, Power Saving Techniques Based on UE Adaption , 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600466, pp. 1-15, Retrieved from the Internet: URL: http://www.3gpp.org/ftp/tsg%5Fran/WG1%5FRL1/TSGR1%5F96/Docs/R1%2D1902771%2Ezip [retrieved on Feb. 16, 2019 ] sections 1-3.

(Continued)

*Primary Examiner* — Hardikkumar D Patel
(74) *Attorney, Agent, or Firm* — Harrity & Harrity, LLP

(57) ABSTRACT

Various aspects of the present disclosure generally relate to wireless communication. In some aspects, a base station (BS) may receive an indication of a traffic pattern for application traffic. The BS may determine, based at least in part on one or more measurements associated with the traffic pattern, one or more parameters for at least one of a discontinuous reception (DRX) configuration for the application traffic, or a semipersistent scheduling (SPS) configuration for the application traffic. The BS may transmit, to a user equipment (UE) that is to receive the application traffic, (Continued)

an indication of the at least one of the DRX configuration or the SPS configuration. Numerous other aspects are provided.

33 Claims, 22 Drawing Sheets

(58) Field of Classification Search
CPC . H04W 76/27; H04W 28/0268; H04W 88/02; H04W 84/042; H04W 72/042; H04W 52/0212; H04W 52/0229; H04W 52/0274; H04W 72/12; H04W 72/23; H04L 1/1848; H04L 1/1832; H04L 5/0057; H04L 5/0058; H04L 5/0053; H04L 5/0007; H04L 5/001; H04L 5/0048; H04L 5/0091; Y02D 30/70
See application file for complete search history.

(56) References Cited

U.S. PATENT DOCUMENTS

| | | | |
|---|---|---|---|
| 2017/0034869 A1* | 2/2017 | Vangala | H04W 28/0268 |
| 2017/0353839 A1* | 12/2017 | Xu | H04W 4/08 |
| 2019/0253986 A1* | 8/2019 | Jeon | H04W 72/0473 |
| 2021/0168584 A1* | 6/2021 | Li | H04W 48/20 |

OTHER PUBLICATIONS

International Search Report and Written Opinion—PCT/US2020/035911—ISA/EPO—dated Sep. 28, 2020.

* cited by examiner

SYNCHRONIZATION OF TRAFFIC AND DISCONTINUOUS RECEPTION AND/OR SEMIPERSISTENT SCHEDULING

CROSS-REFERENCE TO RELATED APPLICATION

This application claims priority to U.S. Provisional Patent Application No. 62/856,503, filed on Jun. 3, 2019, entitled "SYNCHRONIZATION OF TRAFFIC AND DISCONTINUOUS RECEPTION AND/OR SEMIPERSISTENT SCHEDULING," which is hereby expressly incorporated by reference herein.

FIELD OF THE DISCLOSURE

Aspects of the present disclosure generally relate to wireless communication and to techniques and apparatuses for synchronization of traffic and discontinuous reception (DRX) and/or semipersistent scheduling (SPS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting, to a base station (BS) and based, a request for at least one of a discontinuous reception (DRX) configuration for application traffic or a semipersistent scheduling (SPS) configuration for the application traffic, wherein the request includes an indication of a traffic pattern associated with the application traffic; and receiving, from the BS and based at least in part on transmitting the request, an indication of the at least one of the DRX configuration or the SPS configuration.

In some aspects, a UE for wireless communication may include memory and one or more processors operatively coupled to the memory. The memory and the one or more processors may be configured transmit, to a BS, a request for at least one of a DRX configuration for application traffic or an SPS configuration for the application traffic, wherein the request includes an indication of a traffic pattern associated with the application traffic; and receive, from the BS and based at least in part on transmitting the request, an indication of the at least one of the DRX configuration or the SPS configuration.

In some aspects, a non-transitory computer-readable medium may store one or more instructions for wireless communication. The one or more instructions, when executed by one or more processors of an application server, may cause the one or more processors to transmit, to a BS, a request for at least one of a DRX configuration for application traffic or an SPS configuration for the application traffic, wherein the request includes an indication of a traffic pattern associated with the application traffic; and receive, from the BS and based at least in part on transmitting the request, an indication of the at least one of the DRX configuration or the SPS configuration.

In some aspects, an apparatus for wireless communication may include means for transmitting, to a BS, a request for at least one of a DRX configuration for application traffic or an SPS configuration for the application traffic, wherein the request includes an indication of a traffic pattern associated with the application traffic; and means for receiving, from the BS and based at least in part on transmitting the request, an indication of the at least one of the DRX configuration or the SPS configuration.

In some aspects, a method of wireless communication, performed by an application server, may include transmitting, to a BS, a request for at least one of a DRX configuration for a UE or an SPS configuration for the UE; receiving, from the BS and based at least in part on transmitting the request, an indication of the at least one of the DRX configuration or the SPS configuration; and adjusting, based at least in part on at least one of the DRX configuration or the SPS configuration, a traffic pattern for application traffic to be transmitted to the UE.

In some aspects, an application server for wireless communication may include memory and one or more processors operatively coupled to the memory. The memory and the one or more processors may be configured to transmit, to a BS, a request for at least one of a DRX configuration for a UE or an SPS configuration for the UE; receive, from the BS and based at least in part on transmitting the request, an indication of the at least one of the DRX configuration or the SPS configuration; and adjust, based at least in part on at least one of the DRX configuration or the SPS configuration, a traffic pattern for application traffic to be transmitted to the UE.

In some aspects, a non-transitory computer-readable medium may store one or more instructions for wireless communication. The one or more instructions, when executed by one or more processors of an application server, may cause the one or more processors to transmit, to a BS, a request for at least one of a DRX configuration for a UE or an SPS configuration for the UE; receive, from the BS and based at least in part on transmitting the request, an indication of the at least one of the DRX configuration or the SPS configuration; and adjust, based at least in part on at least one of the DRX configuration or the SPS configuration, a traffic pattern for application traffic to be transmitted to the UE.

In some aspects, an apparatus for wireless communication may include means for transmitting, to a BS, a request for at least one of a DRX configuration for a UE or an SPS configuration for the UE; means for receiving, from the BS and based at least in part on transmitting the request, an indication of the at least one of the DRX configuration or the SPS configuration; and means for adjusting, based at least in part on at least one of the DRX configuration or the SPS configuration, a traffic pattern for application traffic to be transmitted to the UE.

In some aspects, a method of wireless communication, performed by a network controller, may include receiving, from an application server, a first request for at least one of a DRX configuration for a UE or an SPS configuration for the UE; transmitting, to a BS, the first request and a second request for a traffic offset between the application server and the BS; receiving, from the BS and based at least in part on transmitting the first request and the second request, an indication of the traffic offset and the at least one of the DRX configuration or the SPS configuration; and transmitting, to the application server, the indication of the traffic offset and the at least one of the DRX configuration or the SPS configuration.

In some aspects, a network controller for wireless communication may include memory and one or more processors operatively coupled to the memory. The memory and the one or more processors may be configured to receive, from an application server, a first request for at least one of a DRX configuration for a UE or an SPS configuration for the UE; transmit, to a BS, the first request and a second request for a traffic offset between the application server and the BS; receive, from the BS and based at least in part on transmitting the first request and the second request, an indication of the traffic offset and the at least one of the DRX configuration or the SPS configuration; and transmit, to the application server, the indication of the traffic offset and the at least one of the DRX configuration or the SPS configuration.

In some aspects, a non-transitory computer-readable medium may store one or more instructions for wireless communication. The one or more instructions, when executed by one or more processors of a network controller, may cause the one or more processors to: receive, from an application server, a first request for at least one of a DRX configuration for a UE or an SPS configuration for the UE; transmit, to a BS, the first request and a second request for a traffic offset between the application server and the BS; receive, from the BS and based at least in part on transmitting the first request and the second request, an indication of the traffic offset and the at least one of the DRX configuration or the SPS configuration; and transmit, to the application server, the indication of the traffic offset and the at least one of the DRX configuration or the SPS configuration.

In some aspects, an apparatus for wireless communication may include means for receiving, from an application server, a first request for at least one of a DRX configuration for a UE or an SPS configuration for the UE; means for transmitting, to a BS, the first request and a second request for a traffic offset between the application server and the BS; means for receiving, from the BS and based at least in part on transmitting the first request and the second request, an indication of the traffic offset and the at least one of the DRX configuration or the SPS configuration; and means for transmitting, to the application server, the indication of the traffic offset and the at least one of the DRX configuration or the SPS configuration.

In some aspects, a method of wireless communication, performed by an application server, may include receiving, from a UE or a network controller, an indication of at least one of a DRX configuration associated with the UE or an SPS configuration associated with the UE; and adjusting, based at least in part on at least one of the DRX configuration or the SPS configuration, a traffic pattern associated with application traffic to be transmitted to the UE.

In some aspects, an application server for wireless communication may include memory and one or more processors operatively coupled to the memory. The memory and the one or more processors may be configured to receive, from a UE or a network controller, an indication of at least one of a DRX configuration associated with the UE or an SPS configuration associated with the UE; and adjust, based at least in part on at least one of the DRX configuration or the SPS configuration, a traffic pattern associated with application traffic to be transmitted to the UE.

In some aspects, a non-transitory computer-readable medium may store one or more instructions for wireless communication. The one or more instructions, when executed by one or more processors of an application server, may cause the one or more processors to receive, from a UE or a network controller, an indication of at least one of a DRX configuration associated with the UE or an SPS configuration associated with the UE; and adjust, based at least in part on at least one of the DRX configuration or the SPS configuration, a traffic pattern associated with application traffic to be transmitted to the UE.

In some aspects, an apparatus for wireless communication may include means for receiving, from a UE or a network controller, an indication of at least one of a DRX configuration associated with the UE or an SPS configuration associated with the UE; and means for adjusting, based at least in part on at least one of the DRX configuration or the SPS configuration, a traffic pattern associated with application traffic to be transmitted to the UE.

In some aspects, a method of wireless communication, performed by a base station (BS), may include receiving an indication of a traffic pattern for application traffic; determining, based at least in part on one or more measurements associated with the traffic pattern, one or more parameters for at least one of a DRX configuration for the application traffic or an SPS configuration for the application traffic; and transmitting, to a UE that is to receive the application traffic, an indication of the at least one of the DRX configuration or the SPS configuration.

In some aspects, a BS for wireless communication may include memory and one or more processors operatively coupled to the memory. The memory and the one or more processors may be configured to receive an indication of a traffic pattern for application traffic; determine, based at least in part on one or more measurements associated with the traffic pattern, one or more parameters for at least one of a DRX configuration for the application traffic or an SPS configuration for the application traffic; and transmit, to a UE that is to receive the application traffic, an indication of the at least one of the DRX configuration or the SPS configuration.

In some aspects, a non-transitory computer-readable medium may store one or more instructions for wireless communication. The one or more instructions, when executed by one or more processors of a BS, may cause the one or more processors to receive an indication of a traffic pattern for application traffic; determine, based at least in part on one or more measurements associated with the traffic pattern, one or more parameters for at least one of a DRX configuration for the application traffic or an SPS configuration for the application traffic; and transmit, to a UE that is to receive the application traffic, an indication of the at least one of the DRX configuration or the SPS configuration.

In some aspects, an apparatus for wireless communication may include means for receiving an indication of a traffic pattern for application traffic; means for determining, based at least in part on one or more measurements associated with the traffic pattern, one or more parameters for at least one of a DRX configuration for the application traffic or an SPS configuration for the application traffic; and means for transmitting, to a UE that is to receive the application traffic, an indication of the at least one of the DRX configuration or the SPS configuration.

In some aspects, a method of wireless communication, performed by a BS, may include receiving, from a UE, a request for at least one of a DRX configuration for application traffic or an SPS configuration for the application traffic, wherein the request indicates a traffic pattern for the application traffic; determining, based at least in part on one or more measurements associated with the traffic pattern, one or more parameters for the at least one of the DRX configuration or the SPS configuration; and transmitting, to the UE, an indication of the at least one of the DRX configuration or the SPS configuration.

In some aspects, a BS for wireless communication may include memory and one or more processors operatively coupled to the memory. The memory and the one or more processors may be configured to receive, from a UE, a request for at least one of a DRX configuration for application traffic, or an SPS configuration for the application traffic, wherein the request indicates a traffic pattern for the application traffic; determine, based at least in part on one or more measurements associated with the traffic pattern, one or more parameters for the at least one of the DRX configuration or the SPS configuration; and transmit, to the UE, an indication of the at least one of the DRX configuration or the SPS configuration.

In some aspects, a non-transitory computer-readable medium may store one or more instructions for wireless communication. The one or more instructions, when executed by one or more processors of a BS, may cause the one or more processors to: receive, from a UE, a request for at least one of a DRX configuration for application traffic or an SPS configuration for the application traffic, wherein the request indicates a traffic pattern for the application traffic; determine, based at least in part on one or more measurements associated with the traffic pattern, one or more parameters for the at least one of the DRX configuration or the SPS configuration; and transmit, to the UE, an indication of the at least one of the DRX configuration or the SPS configuration.

In some aspects, an apparatus for wireless communication may include means for receiving, from a UE, a request for at least one of a DRX configuration for application traffic or an SPS configuration for the application traffic, wherein the request indicates a traffic pattern for the application traffic; means for determining, based at least in part on one or more measurements associated with the traffic pattern, one or more parameters for the at least one of the DRX configuration or the SPS configuration; and means for transmitting, to the UE, an indication of the at least one of the DRX configuration or the SPS configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
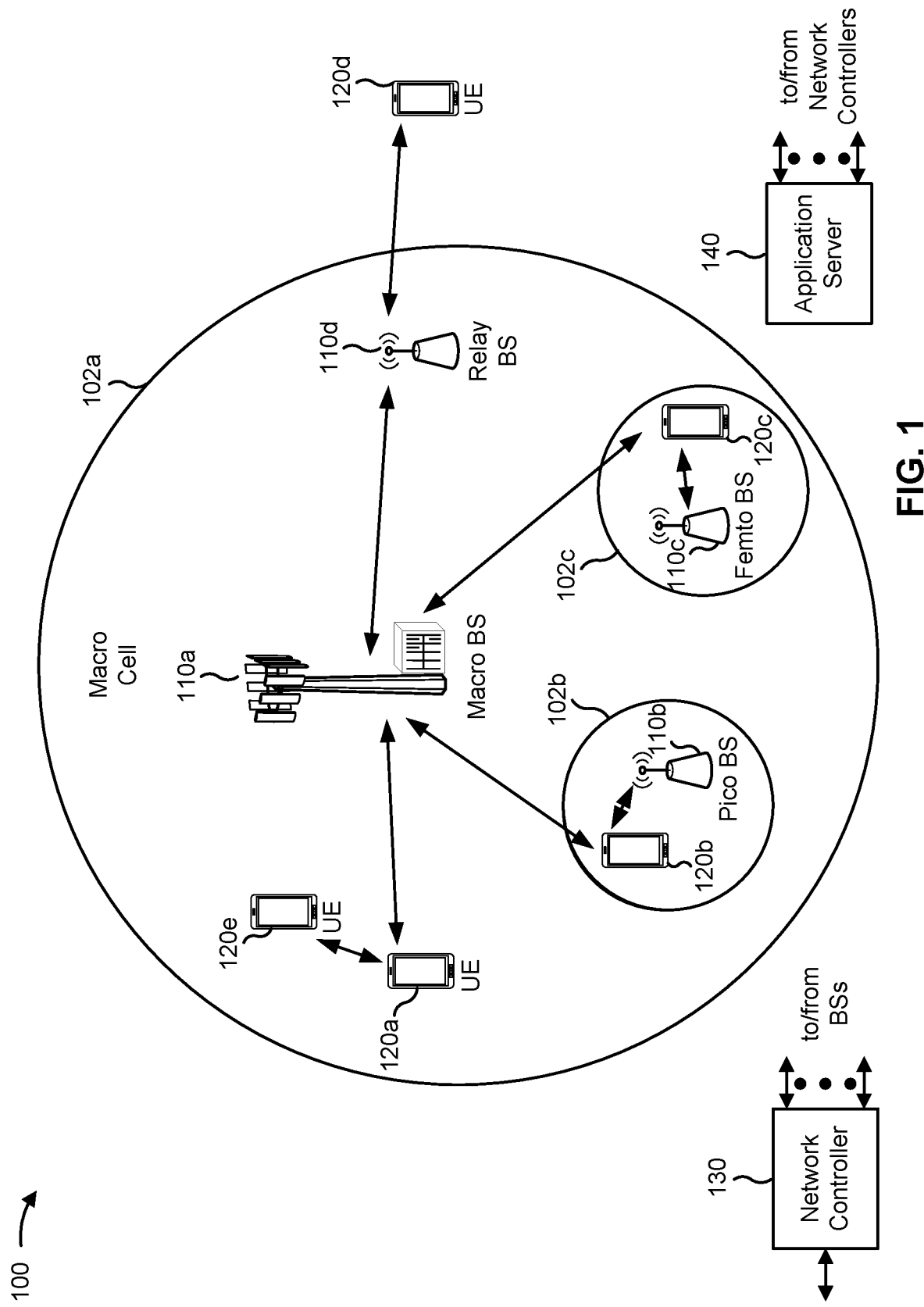
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, wireless network 100 may include one or more network controllers 130. For example, wireless network 100 may include a network controller 130 that implements a network exposure function (NEF) device, a network controller 130 that implements an access and mobility management function (AMF) device, a network controller 130 that implements a session management function (SMF) device, a network controller 130 that implements a user plane function (UPF) device, a network controller 130 that implements a policy control function (PCF) device, and/or the like. In some aspects, the NEF device, PCF device, AMF device, SMF device, and/or UPF device may be included in a core network of wireless network 100 (e.g., a 5G/NR core network).

An application server 140 may host one or more applications, may receive, store, and/or transmit application data associated with the one or more applications, may couple to one or more network controllers and/or one or BSs (e.g., via the one or more network controllers) to receive application data from one or more UEs, to transmit application data to one or more UEs, and/or the like. A UE may access an application hosted by application server 140 via an application client installed on the UE, via a web browser installed on the UE, and/or the like. In some aspects, application server 140 may include one or more server devices, one or more mobile edge compute (MEC) devices, one or more cloud-computing environments, and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
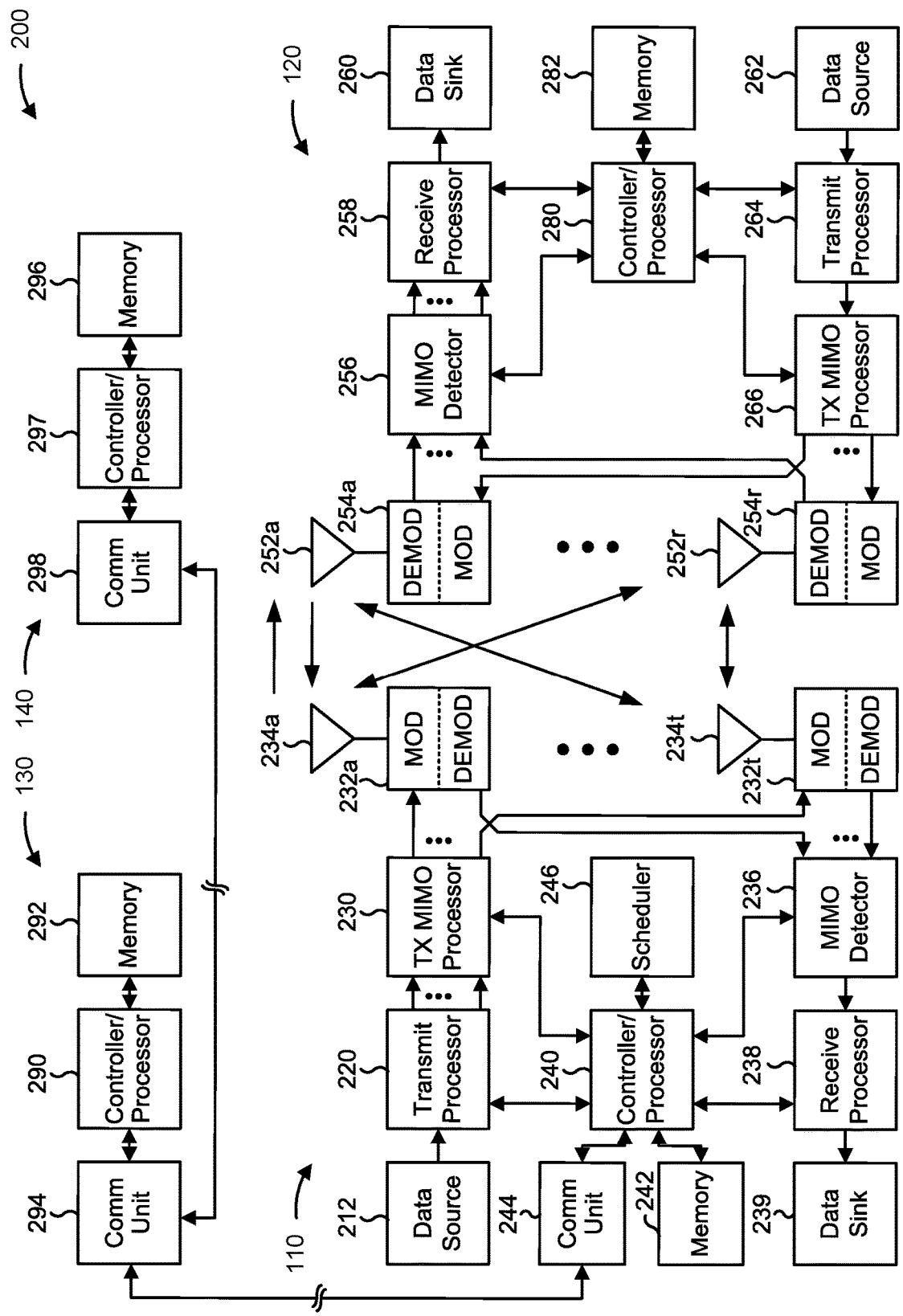
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and may communicate with network controller 130 via communication unit 244.

Network controller 130 may include communication unit 294, controller/processor 290, and memory 292. Network controller 130 may communicate with base station 110 and/or application server 140 via communication unit 294. Application server 140 may include communication unit 298, controller/processor 297, and memory 296. Application server 140 may communicate with network controller 130 via communication unit 298.

Controller/processor 240 of base station 110, controller/processor 280 of UE 120, controller/processor 290 of network controller 130, controller/processor 297 of application server 140, and/or any other component(s) of FIG. 2 may perform one or more techniques associated with synchronization of traffic and discontinuous reception (DRX) and/or semipersistent scheduling (SPS), as described in more detail elsewhere herein. For example, controller/processor 240 of base station 110, controller/processor 280 of UE 120, controller/processor 290 of network controller 130, controller/processor 297 of application server 140, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. Memories 242, 282, and 292 may store data and program codes for base station 110, UE 120, and network controller 130, respectively. A scheduler 246 may schedule UEs for data transmission on the downlink and/or uplink.

In some aspects, UE 120 may include means for transmitting, to a base station 110, a request for at least one of a DRX configuration for application traffic or an SPS configuration for the application traffic, wherein the request includes an indication of a traffic pattern associated with the application traffic, means for receiving, from the base station 110 and based at least in part on transmitting the request, an indication of the at least one of the DRX configuration or the SPS configuration, and/or the like. In some aspects, such means may include one or more components of UE 120 described in connection with FIG. 2.

In some aspects, base station 110 may include means for receiving an indication of a traffic pattern for application traffic, means for determining, based at least in part on one or more measurements associated with the traffic pattern, one or more parameters for at least one of a DRX configuration for the application traffic or an SPS configuration for the application traffic, means for transmitting, to a UE 120 that is to receive the application traffic, an indication of the at least one of the DRX configuration or the SPS configuration, and/or the like. In some aspects, base station 110 may include means for receiving, from a UE 120, a request for at least one of a DRX configuration for application traffic or a SPS configuration for the application traffic, wherein the request indicates a traffic pattern for the application traffic, means for determining, based at least in part on one or more measurements associated with the traffic pattern, one or more parameters for the at least one of the DRX configuration or the SPS configuration, means for transmitting, to the UE 120, an indication of the at least one of the DRX configuration or the SPS configuration, and/or the like. In some aspects, such means may include one or more components of base station 110 described in connection with FIG. 2.

In some aspects, network controller 130 may include means for receiving, from an application server, a first request for at least one of a DRX configuration for a UE 120 or an SPS configuration for the UE 120, means for transmitting, to a base station 110, the first request and a second request for a traffic offset between the application server and the BS 110, means for receiving, from the BS 110 and based at least in part on transmitting the first request and the second request, an indication of the traffic offset and the at least one of the DRX configuration or the SPS configuration, means for transmitting, to the application server, the indication of the traffic offset and the at least one of the DRX configuration or the SPS configuration, and/or the like. In some aspects, such means may include one or more components of network controller 130 described in connection with FIG. 2.

In some aspects, application server 140 may include means for transmitting, to a base station 110, a request for at least one of a DRX configuration for a UE 120 or an SPS configuration for the UE 120, means for receiving, from the base station 110 and based at least in part on transmitting the request, an indication of the at least one of the DRX configuration or the SPS configuration, and adjusting, based at least in part on at least one of the DRX configuration or the SPS configuration, a traffic pattern for application traffic to be transmitted to the UE 120, and/or the like. In some aspects, application server 140 may include means for receiving, from a UE 120 or a network controller 130, an indication of at least one of a DRX configuration for the UE 120 or an SPS configuration for the UE 120, means for adjusting, based at least in part on at least one of the DRX configuration or the SPS configuration, a traffic pattern associated with application traffic to be transmitted to the UE 120, and/or the like. In some aspects, such means may include one or more components of application server 140 described in connection with FIG. 2.

As indicated above, FIG. 2 is provided as an example. Other examples may differ from what is described with regard to FIG. 2.

Figure 3A:
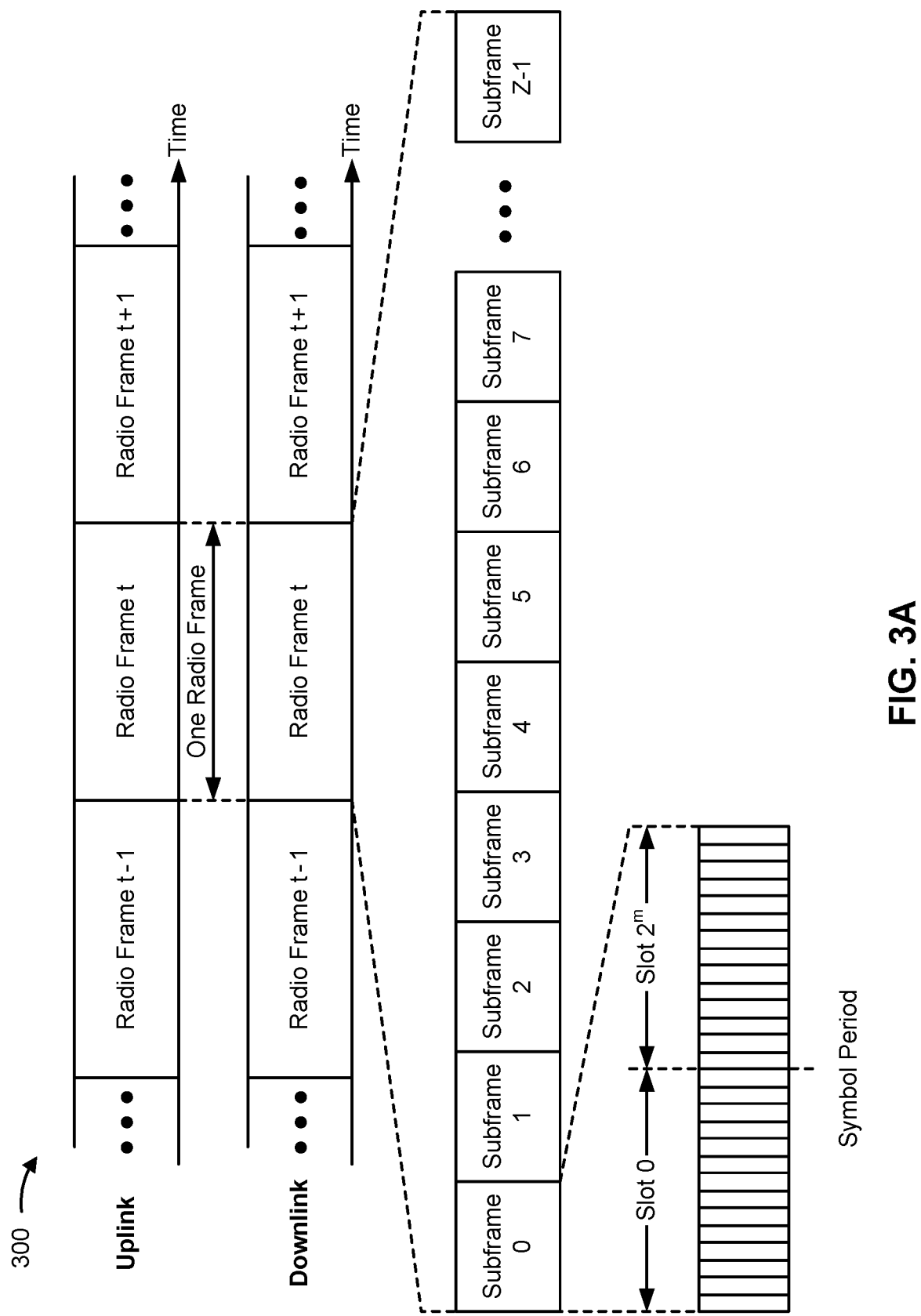
FIG. 3A is a block diagram conceptually illustrating an example of a frame structure in a wireless communication network, in accordance with various aspects of the present disclosure.

FIG. 3A shows an example frame structure 300 for a frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
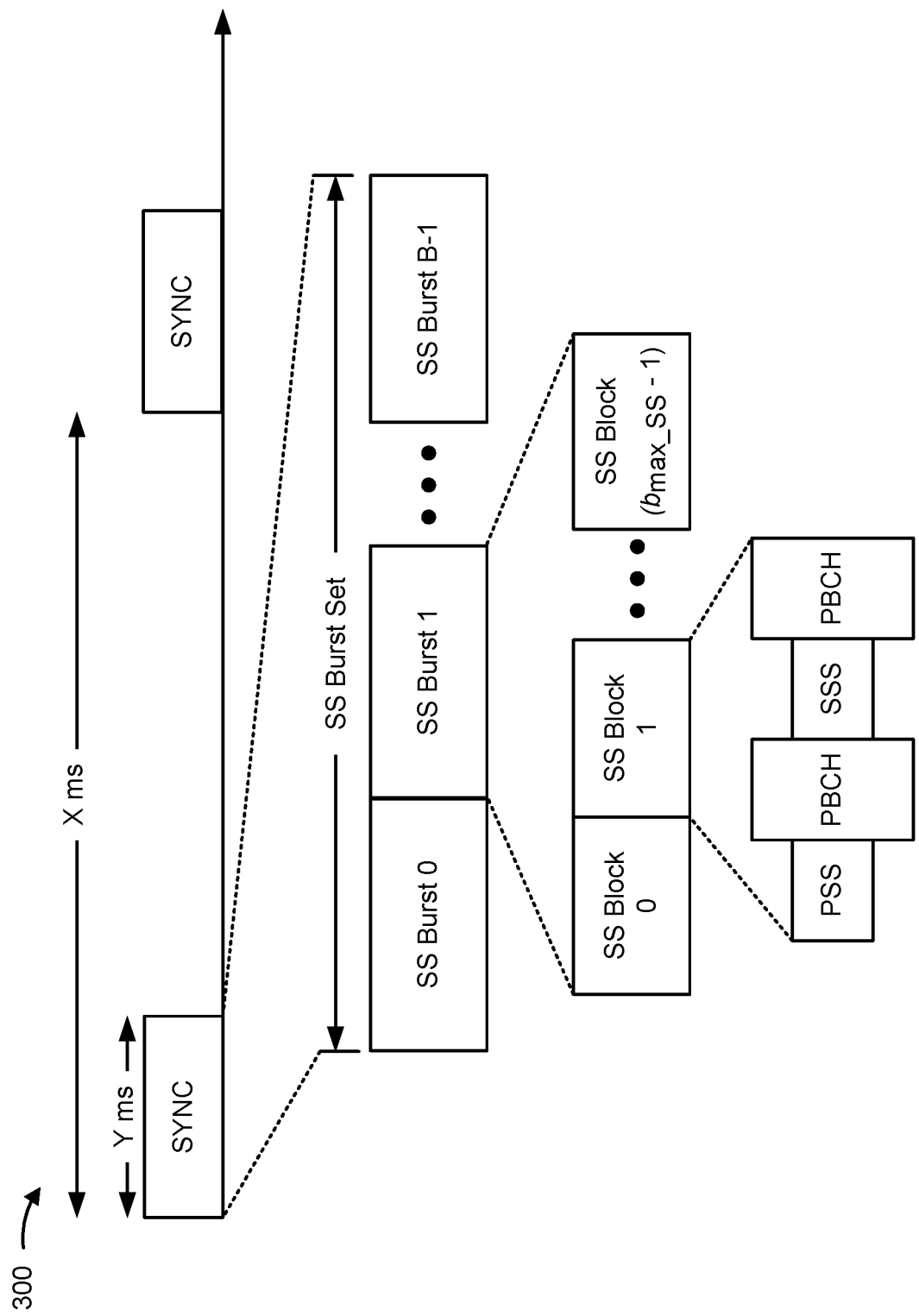
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
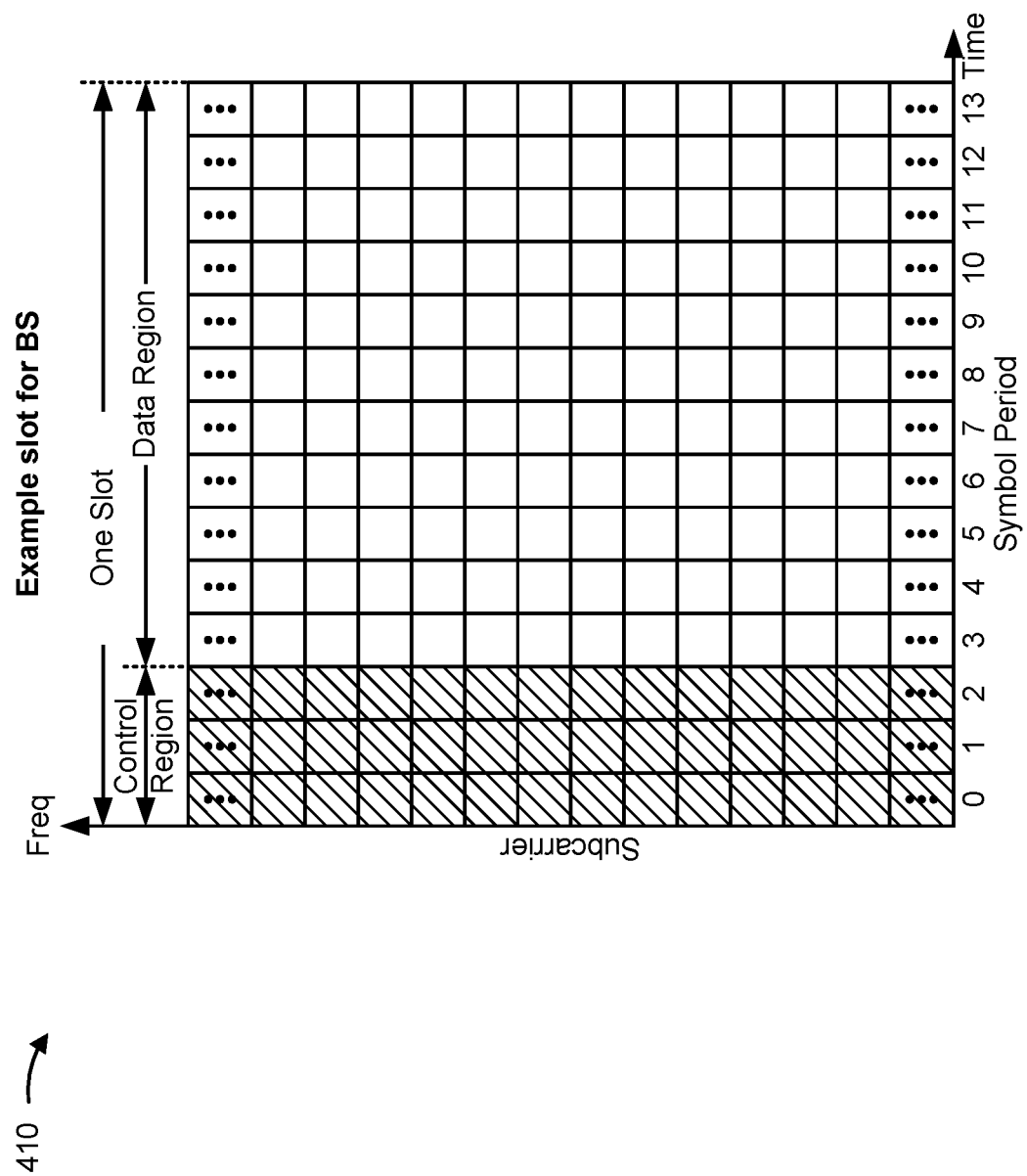
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

A UE and an application server may communicate via a wireless network. For example, the application server may transmit application traffic to the UE and/or the UE may transmit application traffic to the application server. Some application traffic may be periodic in that the application traffic is transmitted according to a particular traffic cycle. If the application server is unaware of a DRX cycle (e.g., a cycle in which the UE sleeps for a sleep period and wakes up to monitor for downlink traffic at the expiration of the time period) and/or an SPS cycle (e.g., a cycle in which the UE is permitted to transmit uplink traffic without having to wait for a dynamic scheduling grant) of the UE, misalignment may occur between the traffic cycle of the application traffic and the DRX cycle and/or the SPS cycle of the UE.

Moreover, a communication path between the UE and the application server may include one or more devices and/or components included in a computer network such as the Internet, one or more devices included in the wireless network, such as one or more base stations, one or more core network devices and/or components (e.g., a UPF device and/or the like), and/or the like. As a result, a transmission delay may accumulate along the communication path between the UE and the application server, which can cause further misalignment between the traffic cycle of the application traffic and the DRX cycle and/or the SPS cycle of the UE.

Misalignment between the traffic cycle of the application traffic and the DRX cycle of the UE may result in the UE waking up from a sleep period to monitor for downlink traffic when the application server is not transmitting application traffic to the UE (which results in the wasted consumption of processing and/or memory resources of the UE), may result in the UE being in a sleep period when the application server is transmitting application traffic to the UE (which results in lost or dropped application traffic, increases in retransmissions of application traffic, and/or the like), and/or the like. Misalignment between the traffic cycle of the application traffic and the SPS cycle of the UE may result in delays in the transmission of application traffic from the UE to the application server and/or the like.

Some aspects described herein provide techniques and apparatuses for synchronization of traffic and DRX and/or SPS. In some aspects, a BS may synchronize and/or align a traffic cycle, for application traffic associated with an application server, and a DRX cycle and/or an SPS cycle associated with a UE. For example, the BS may receive an indication of a traffic pattern associated with the application traffic, which may include an indication of the traffic cycle, and may generate or adjust a DRX configuration and/or an SPS configuration such that the DRX cycle and/or the SPS cycle are synchronized with the traffic cycle of the application traffic. In some aspects, an application server may synchronize and/or align a traffic cycle, for application traffic associated with an application server, and a DRX cycle and/or an SPS cycle associated with a UE. For example, the application server may receive an indication of a DRX configuration and/or an SPS configuration associated with the UE and may adjust a traffic pattern associated with the application traffic such that the traffic cycle of the application traffic is synchronized with a DRX cycle and/or an SPS cycle associated with a UE.

In this way, the traffic pattern and the DRX cycle and/or SPS cycle may be synchronized and/or aligned such that the UE wakes up from a sleep period to monitor for downlink traffic when the application server is transmitting application traffic to the UE, such that the UE is in a sleep period when the application server is not transmitting application traffic to the UE, such that the UE is permitted to transmit application traffic to the application server without delay, and/or the like. This reduces lost or dropped application traffic, reduces retransmissions of application traffic, reduces delays in the transmission of application traffic from the UE to the application server, and reduces consumption of processing and/or memory resources of the UE caused by misalignment between the traffic cycle of the application traffic and the DRX cycle of the UE and/or the SPS cycle of the UE.

Figure 5:
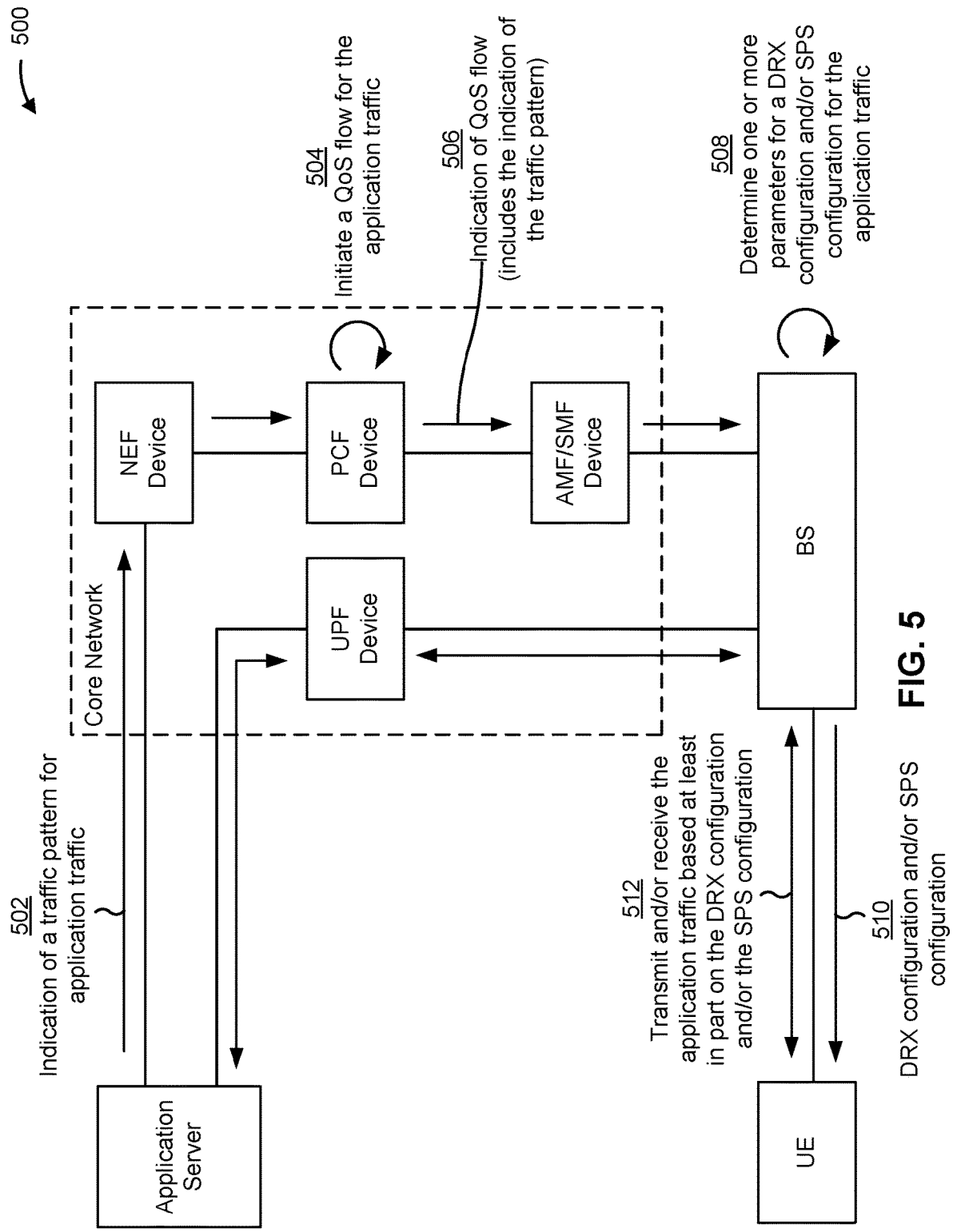
FIGS. 5-8C are diagrams illustrating examples of synchronization of traffic and discontinuous reception (DRX) and/or semipersistent scheduling (SPS), in accordance with various aspects of the present disclosure.

FIG. 5 is a diagram illustrating examples 500 of synchronization of traffic and DRX and/or SPS, in accordance with various aspects of the present disclosure. As shown in FIG. 5, examples 500 may include one or more devices, such as a UE (e.g., UE 120), a BS (e.g., BS 110), an AMF device (e.g., network controller 130), an SMF device (e.g., network controller 130), a PCF device (e.g., network controller 130), a UPF device (e.g., network controller 130), an NEF device (e.g., network controller 130), an application server (e.g., application server 140), and/or the like. In some aspects, examples 500 may include different quantities and/or configurations of the devices than are illustrated in FIG. 5.

The AMF device, SMF device, PCF device, UPF device, and NEF device may be included in a core network of a wireless network (e.g., wireless network 100), such as a 5G/NR core network (e.g., a next generation (NG) Core). The AMF device may manage authentication, activation, deactivation, and/or mobility functions associated with the UE. The AMF may facilitate the selection of a gateway (e.g., a serving gateway, a packet data network gateway, a UPF device, and/or the like) to serve traffic to and/or from the UE. The SMF device may be responsible for managing communication sessions associated with the UE. The PCF device may be responsible for generating, managing, and/or providing policy rules to other devices included in the core network, may be responsible for establishing and/or managing quality of service (QoS) flows for traffic that is transmitted through the wireless network, and/or the like. The NEF device may support the exposure of capabilities and/or events for other devices in the wireless network and/or external to the wireless network in order to facilitate discovery of network services for the other devices. The UPF device may function as a session anchor and/or gateway for the UE, may forward traffic (e.g., user plane traffic, application traffic, and/or the like) between the UE and the application server, and/or the like. In this way, the UE may transmit application traffic to the application server via the UPF device and/or the application server may transmit application traffic to the UE via the UPF device.

The application server may host one or more applications, store information associated with the one or more applications, transmit and/or receive application traffic associated with the one or more applications, and/or the like. The application traffic may include various types of periodic traffic, such as voice traffic, video traffic, virtual reality traffic, augmented reality traffic, heartbeat signals, gaming traffic, and/or the like. In some aspects, the application traffic may include a non time sensitive communication (non-TSC) that is not carried over a delay critical guaranteed bit rate (GBR) type of QoS flow.

The application server may communicatively connect with the UE via the UPF device, BS, and/or another device. Moreover, the application server may communicatively connect with the UPF device via one or more networks external to the wireless network, such as the Internet and/or other types of public and/or private computer and/or telecommunications networks. In this case, various types of transmission delays may accumulate along a communication path between the application server and the UE, such as an Internet delay (e.g., a delay due to application traffic being transmitted from the application server to the UPF device over the Internet and/or other public or private networks external to the wireless network), a backhaul delay (e.g., a delay due to application traffic being transmitted between various components included in the wireless network), and/or the like. Accordingly, the application server, the devices included in the core network, the BS, and/or the UE may coordinate to synchronize and/or align a traffic cycle, for application traffic associated with the application server, and a DRX cycle and/or an SPS cycle associated with the UE, in order to reduce, mitigate, and/or eliminate the effects of the transmission delays that accumulate along the communication path between the application server and the UE.

As shown in FIG. 5, and by reference number 502, the application server may transmit, to the NEF device, an indication of a traffic pattern for application traffic associated with the application server. In some aspects, the application server may transmit the indication of the traffic pattern based at least in part on determining that the application server is to transmit the application traffic to the UE. In some aspects, the NEF device may forward the indication of the traffic pattern to other devices included in the core network, such as the PCF device and/or the like.

In some aspects, the traffic pattern may specify a traffic cycle associated with the application traffic (e.g., a length of a time period between traffic bursts of the application traffic), a traffic burst size associated with the application traffic (e.g., a size of bursts of application traffic transmitted from the application server), a starting time or phase of the application traffic, and/or the like.

As further shown in FIG. 5, and by reference number 504, the PCF device may receive the indication of the traffic pattern associated for the application traffic, and may initiate and/or establish a QoS flow for the application traffic. As indicated above, the QoS flow for the application traffic may be a non delay critical and/or non-GBR type of QoS flow.

In some aspects, the QoS flow may include one or more QoS parameters, such as a priority level, a permitted packet delay budget, a permitted packet error rate, and/or the like. The one or more QoS parameters may be based at least in part on a traffic type associated with the application. For example, the one or more QoS parameters may be associated with particular values if the application traffic is voice traffic, may be associated with other particular values if the application traffic is video traffic, and/or the like.

As further shown in FIG. 5, and by reference number 506, the PCF device may transmit an indication of the QoS flow to the BS. In some aspects, the PCF device may transmit the indication of the QoS flow to the BS via the AMF device, via the SMF device, and/or the like. In some aspects, the PCF device may transmit the indication of the QoS flow based at least in part on initiating the QoS flow.

In some aspects, the indication of the QoS flow may include a QoS profile associated with the QoS flow. The QoS profile may include an indication of the QoS flow (e.g., a QoS flow identifier (QFI) associated with the QoS flow), may include an indication of the one or more QoS parameters configured for the QoS flow, may include an indication of a QoS flow type associated with the QoS flow (e.g., a 5G QoS identifier (5QI) value associated with the QoS flow type), and/or the like. Moreover, the PCF device may further include, in the QoS profile, an indication of the traffic pattern associated with the application traffic.

As further shown in FIG. 5, and by reference number 508, the BS may receive the indication of the QoS flow and may determine one or more parameters for a DRX configuration and/or an SPS configuration, associated with the UE, for the application. In this way, the BS may use the indication of the traffic pattern in the indication of the QoS flow to generate the DRX configuration and/or the SPS configuration such that the DRX cycle and/or SPS cycle of the UE are synchronized and/or aligned with the traffic pattern (e.g., synchronized and/or aligned with the traffic cycle, traffic burst size, starting time and/or phase, and/or the like of the application traffic).

In some aspects, the BS may determine the one or more parameters for the DRX configuration and/or the SPS configuration by performing one or more measurements associated with the traffic pattern of the application traffic. For example, the BS may perform one or more downlink traffic measurements associated with the traffic pattern to determine a first offset between the traffic cycle associated with the application traffic and the DRX cycle for the UE (e.g., a DRX offset). As another example, the BS may perform one or more uplink traffic measurements associated with the traffic pattern to determine a second offset between the traffic cycle associated with the application traffic and the SPS cycle for the UE (e.g., an SPS offset). The first offset and the second offset may account for the various types of transmission delays along the communication path between the UE and the application server in order to synchronize and/or align the DRX cycle and/or SPS cycle of the UE with the traffic cycle of the application traffic. In some aspects, the one or more measurements may include round-trip time (RTT) measurements, latency measurements, and/or the like.

In some aspects, the one or more parameters for the DRX configuration may include the first offset, the traffic burst size for the application traffic, the starting time or phase of the application traffic, a DRX cycle duration (e.g., which may correspond to the duration of the traffic cycle of the application traffic) and/or the like. In some aspects, the one or more parameters for the SPS configuration may include the second offset, the traffic burst size for the application traffic, the starting time or phase of the application traffic, an SPS grant size, and/or the like.

As further shown in FIG. 5, and by reference number 510, the BS may transmit an indication of the DRX configuration and/or the SPS configuration to the UE. In some aspects, the BS may transmit the indication of the DRX configuration and/or the SPS configuration to the UE based at least in part on generating the DRX configuration and/or the SPS configuration, based at least in part on receiving a request from the UE for the DRX configuration and/or the SPS configuration, and/or the like. In some aspects, the BS may transmit the indication of the DRX configuration and/or the SPS configuration in a radio resource control (RRC) communication, a downlink control information (DCI) communication, a medium access control (MAC) control element (MAC-CE) communication, and/or the like.

As further shown in FIG. 5, and by reference number 512, the UE may receive the indication of the DRX configuration and/or the SPS configuration and may transmit and/or receive application data, associated with the application server, based at least in part on the DRX configuration and/or the SPS configuration. For example, the UE may transition in and out of a sleep or idle mode to receive application traffic from the application server based at least in part on the DRX configuration, may transmit application traffic to the application server based at least in part on the SPS configuration, and/or the like.

In this way, the BS may synchronize and/or align a DRX cycle and/or an SPS cycle associated with the UE to a traffic cycle, for the application traffic associated with the application server. In this way, the traffic pattern and the DRX cycle and/or SPS cycle may be synchronized and/or aligned such that the UE wakes up from a sleep period to monitor for downlink traffic when the application server is transmitting application traffic to the UE, such that the UE is in a sleep period when the application server is not transmitting application traffic to the UE, such that the UE is permitted to transmit application traffic to the application server without delay, and/or the like. This reduces lost or dropped application traffic, reduces retransmissions of application traffic, reduces delays in the transmission of application traffic from the UE to the application server, and reduces consumption of processing and/or memory resources of the UE caused by misalignment between the traffic cycle of the application traffic and the DRX cycle of the UE and/or the SPS cycle of the UE.

As indicated above, FIG. 5 is provided as one or more examples. Other examples may differ from what is described with respect to FIG. 5.

Figure 6A:
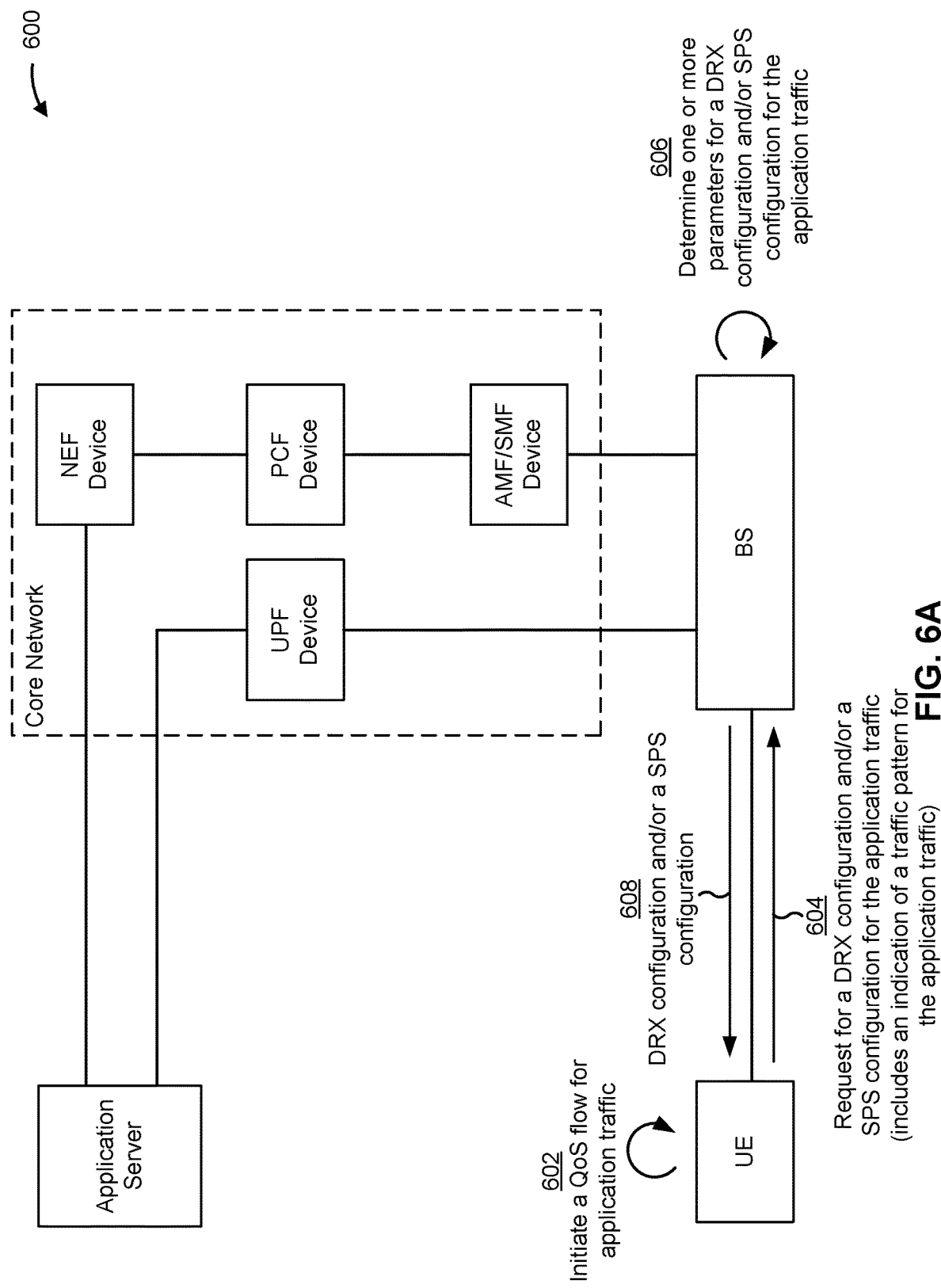
Figure 6B:
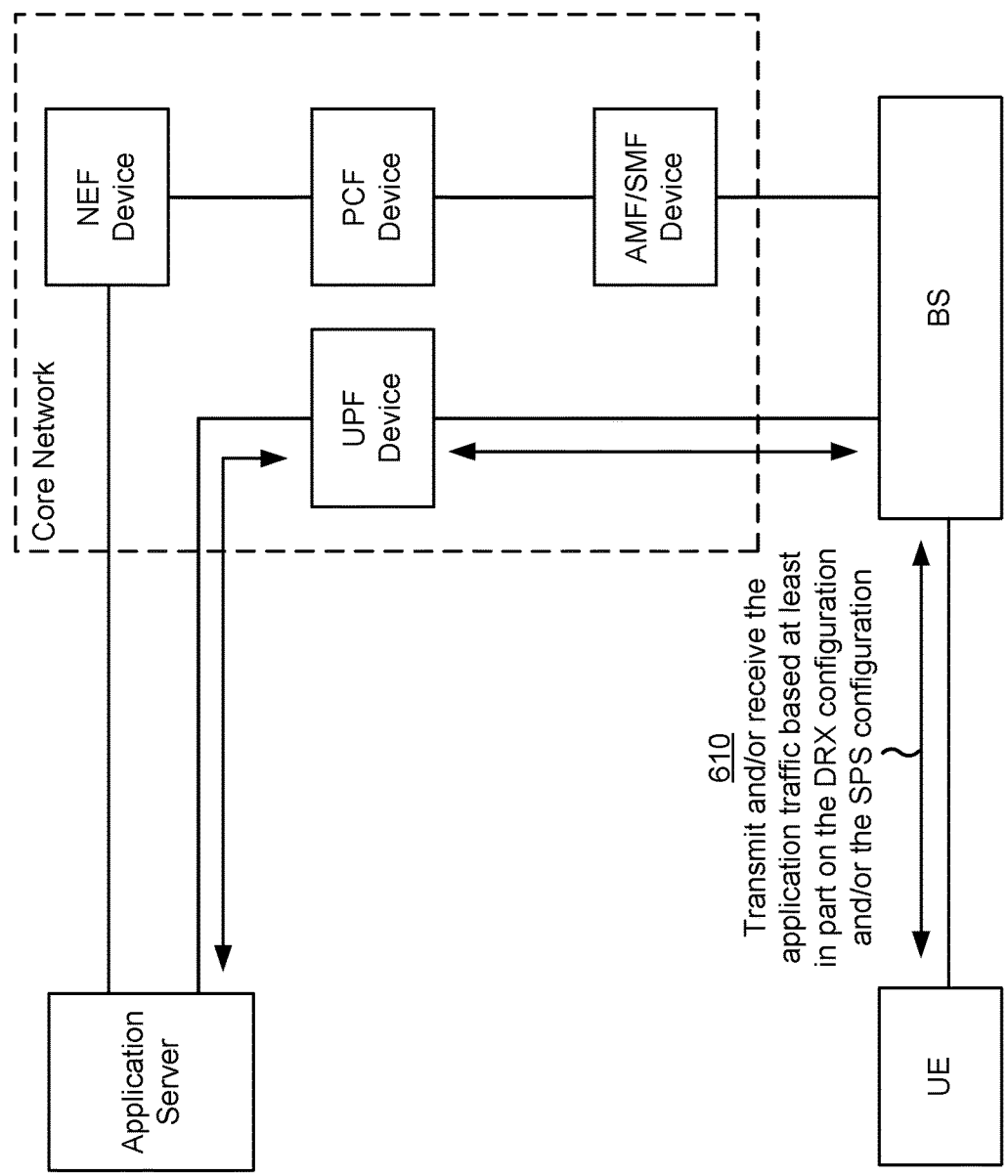

FIGS. 6A and 6B are diagrams illustrating examples 600 of synchronization of traffic and DRX and/or SPS, in accordance with various aspects of the present disclosure. As shown in FIGS. 6A and 6B, examples 600 may include one or more devices, such as a UE (e.g., UE 120), a BS (e.g., BS 110), an AMF device (e.g., network controller 130), an SMF device (e.g., network controller 130), a PCF device (e.g., network controller 130), a UPF device (e.g., network controller 130), an NEF device (e.g., network controller 130), an application server (e.g., application server 140), and/or the like. In some aspects, examples 600 may include different quantities and/or configurations of the devices than illustrated in FIGS. 6A and 6B. In some aspects, the AMF device, SMF device, PCF device, UPF device, and NEF device may be included in a core network of a wireless network (e.g., wireless network 100), such as a 5G/NR core network (e.g., an NG Core).

In some aspects, the application server may host one or more applications, store information associated with the one or more applications, transmit and/or receive application traffic associated with the one or more applications, and/or the like. The application traffic may include various types of periodic traffic, such as voice traffic, video traffic, virtual reality traffic, augmented reality traffic, heartbeat signals, gaming traffic, and/or the like. In some aspects, the application traffic may include a non-TSC that is not carried over a delay critical GBR type of QoS flow.

In some aspects, the application server, the devices included in the core network, the BS, and/or the UE may coordinate to synchronize and/or align a traffic cycle, for application traffic associated with the application server, and a DRX cycle and/or an SPS cycle associated with the UE, in order to reduce, mitigate, and/or eliminate the effects of the transmission delays that accumulate along the communication path between the application server and the UE.

As shown in FIG. 6A, and by reference number 602, the UE may determine to initiate a QoS flow for the application traffic. As indicated above, the QoS flow for the application traffic may be a non delay critical and/or non-GBR type of QoS flow. In some aspects, the UE may initiate the QoS flow by transmitting a QoS flow request to the PCF device via the BS, AMF device, and/or SMF device, and the PCF device may establish the QoS flow for the application traffic. In some aspects, the QoS flow may include one or more QoS parameters, such as a priority level, a permitted packet delay budget, a permitted packet error rate, and/or the like. The one or more QoS parameters may be based at least in part on a traffic type associated with the application. For example, the one or more QoS parameters may be associated with particular values if the application traffic is voice traffic, may be associated with other particular values if the application traffic is video traffic, and/or the like.

As further shown in FIG. 6A, and by reference number 604, the UE may transmit, to the BS, a request for a DRX configuration and/or an SPS configuration for application traffic associated with the application server. In some aspects, the request may include an indication of a traffic pattern for the application traffic, an indication of the QoS flow for the application traffic (e.g., a 5QI value associated with the QoS flow, a QFI associated with the QoS flow, and/or another type of QoS flow indicator), and/or the like. In some aspects, the UE may transmit the request based at least in part on initiating the QoS flow for the application traffic. Additionally and/or alternatively, the UE may include an indication of the traffic pattern for the application traffic to the BS, and/or the PCF device may transmit the indication of the QoS flow to the BS.

In some aspects, the traffic pattern may specify a traffic cycle associated with the application traffic (e.g., a period length between traffic bursts of the application traffic), a traffic burst size associated with the application traffic (e.g., a time length of bursts of application traffic transmitted from the application server), a starting time or phase of the application traffic, and/or the like.

In some aspects, the UE may transmit the request in one or more uplink communications, such as an RRC communication, an uplink control information (UCI) communication, a MAC-CE communication, and/or the like. For example, the request may be included in a DRX and/or SPS request in an RRC communication, may be included in a buffer status report (BSR) in a MAC-CE communication, and/or the like.

As further shown in FIG. 6A, and by reference number 606, the BS may receive the request and may determine one or more parameters for a DRX configuration and/or an SPS configuration, associated with the UE, for the application. In this way, the BS may use the indication of the traffic pattern and/or QoS flow in the request to generate the DRX configuration and/or the SPS configuration such that the DRX cycle and/or SPS cycle of the UE are synchronized and/or aligned with the traffic pattern (e.g., synchronized and/or aligned with the traffic cycle, traffic burst size, starting time and/or phase, and/or the like of the application traffic).

In some aspects, the BS may determine the one or more parameters for the DRX configuration and/or the SPS configuration by performing one or more measurements associated with the traffic pattern of the application traffic. For example, the BS may perform one or more downlink traffic measurements associated with the traffic pattern to determine a first offset between the traffic cycle associated with the application traffic and the DRX cycle for the UE (e.g., a DRX offset). As another example, the BS may perform one or more uplink traffic measurements associated with the traffic pattern to determine a second offset between the traffic cycle associated with the application traffic and the SPS cycle for the UE (e.g., an SPS offset). The first offset and the second offset may account for the various types of transmission delays along the communication path between the UE and the application server in order to synchronize and/or align the DRX cycle and/or SPS cycle of the UE with the traffic cycle of the application traffic. In some aspects, the one or more measurements may include RTT measurements, latency measurements, and/or the like.

In some aspects, the one or more parameters for the DRX configuration may include the first offset, the traffic burst size for the application traffic, the starting time or phase of the application traffic, a DRX cycle duration (e.g., which may correspond to the duration of the traffic cycle of the application traffic) and/or the like. In some aspects, the one or more parameters for the SPS configuration may include the second offset, the traffic burst size for the application traffic, the starting time or phase of the application traffic, an SPS grant size, and/or the like.

As further shown in FIG. 6A, and by reference number 608, the BS may transmit an indication of the DRX configuration and/or the SPS configuration to the UE. In some aspects, the BS may transmit the indication of the DRX configuration and/or the SPS configuration to the UE based at least in part on generating the DRX configuration and/or the SPS configuration, based at least in part on receiving a request from the UE for the DRX configuration and/or the SPS configuration, and/or the like. In some aspects, the BS may transmit the indication of the DRX configuration and/or the SPS configuration in an RRC communication, a DCI communication, a MAC-CE communication, and/or the like.

As shown in FIG. 6B, and by reference number 610, the UE may receive the indication of the DRX configuration and/or the SPS configuration and may transmit and/or receive application data, associated with the application server, based at least in part on the DRX configuration and/or the SPS configuration. For example, the UE may transition in and out of a sleep or idle mode to receive application traffic from the application server based at least in part on the DRX configuration, may transmit application traffic to the application server based at least in part on the SPS configuration, and/or the like.

In this way, the BS may synchronize and/or align a DRX cycle and/or an SPS cycle associated with the UE to a traffic cycle, for the application traffic associated with the application server. In this way, the traffic pattern and the DRX cycle and/or SPS cycle may be synchronized and/or aligned such that the UE wakes up from a sleep period to monitor for downlink traffic when the application server is transmitting application traffic to the UE, such that the UE is in a sleep period when the application server is not transmitting application traffic to the UE, such that the UE is permitted to transmit application traffic to the application server without delay, and/or the like. This reduces lost or dropped application traffic, reduces retransmissions of application traffic, reduces delays in the transmission of application traffic from the UE to the application server, and reduces consumption of processing and/or memory resources of the UE caused by misalignment between the traffic cycle of the application traffic and the DRX cycle of the UE and/or the SPS cycle of the UE.

As indicated above, FIGS. 6A and 6B are provided as examples. Other examples may differ from what is described with respect to FIGS. 6A and 6B.

Figure 7A:
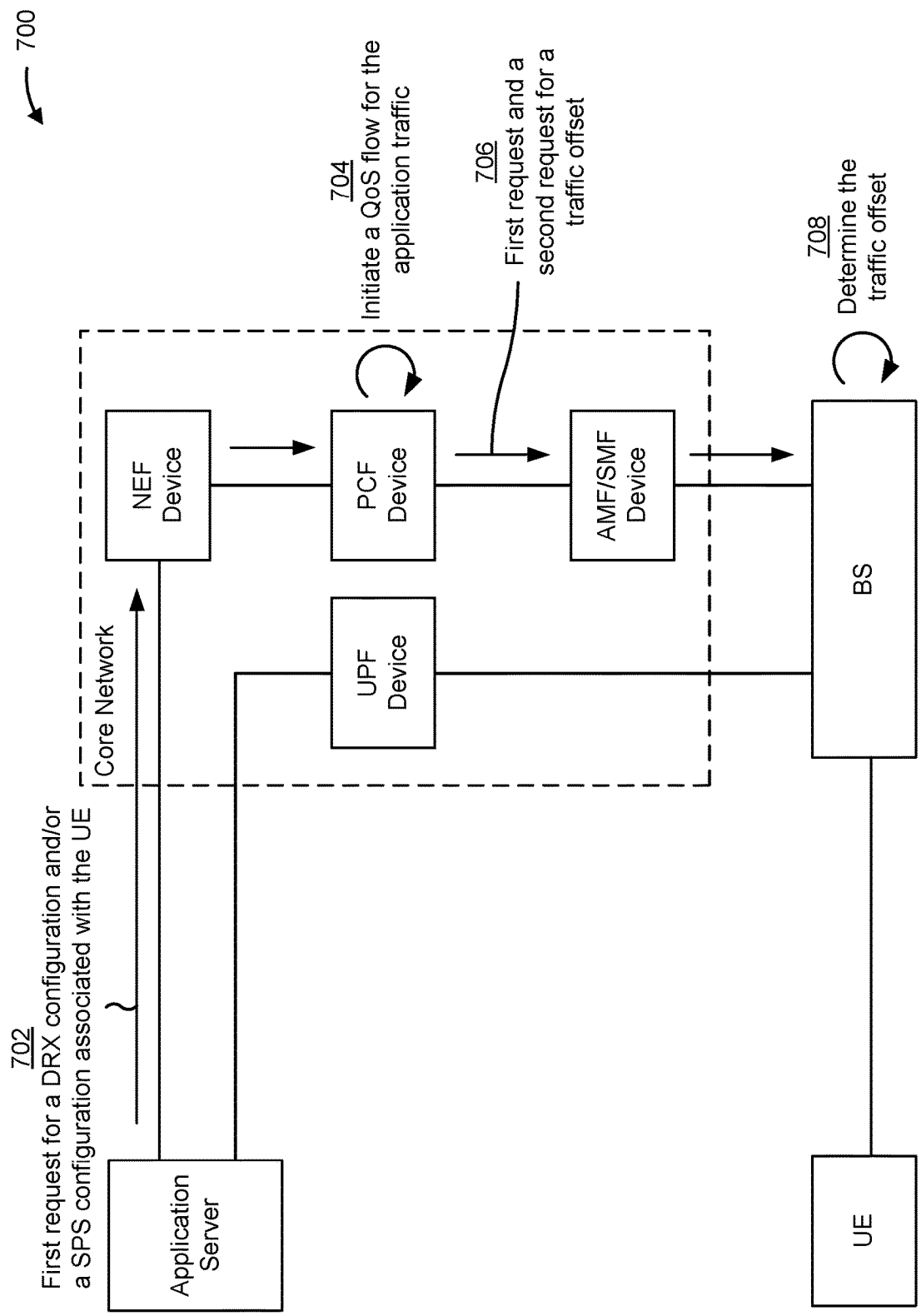
Figure 7B:
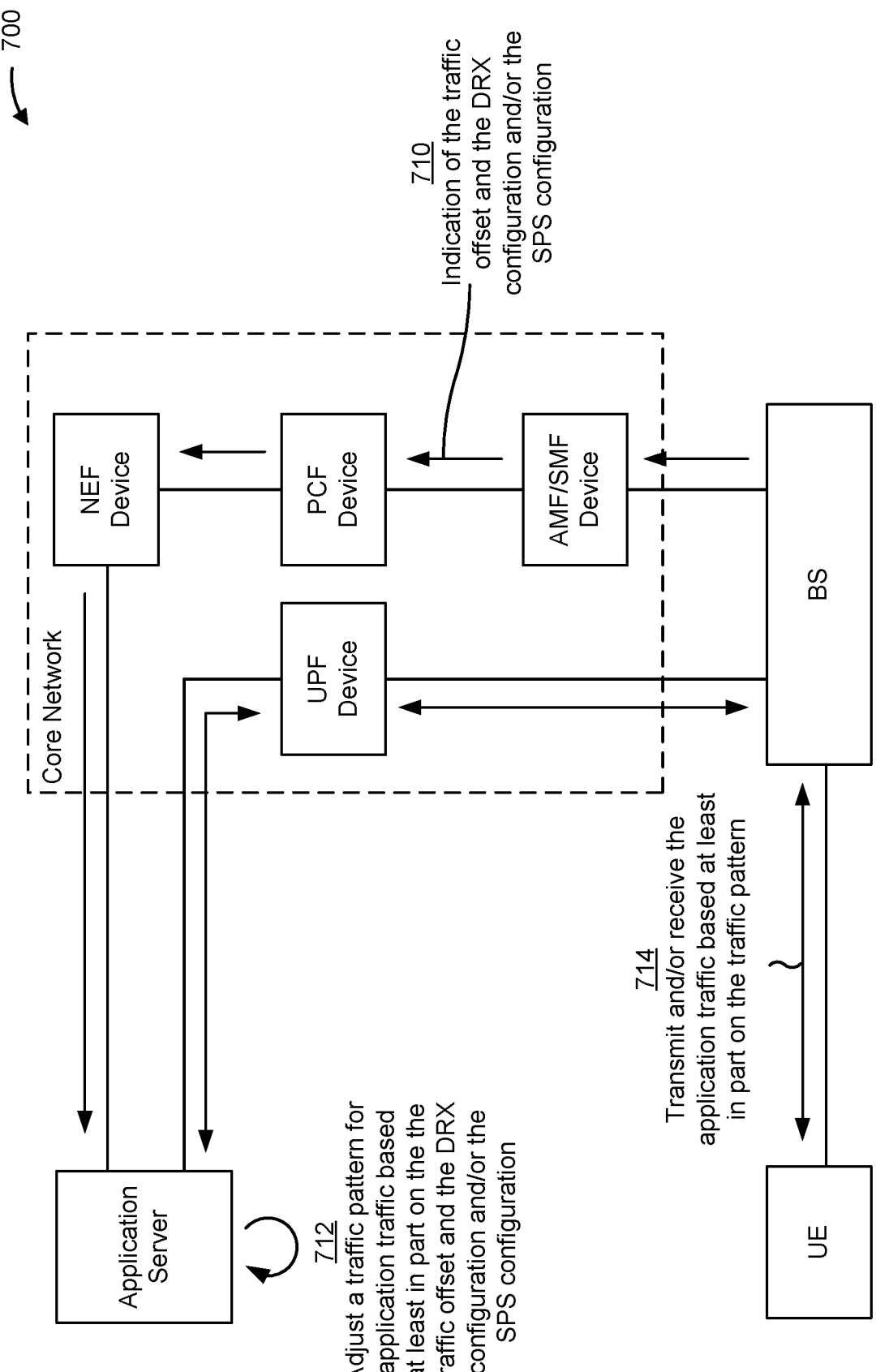

FIGS. 7A and 7B are diagrams illustrating examples 700 of synchronization of traffic and DRX and/or SPS, in accordance with various aspects of the present disclosure. As shown in FIGS. 7A and 7B, examples 700 may include one or more devices, such as a UE (e.g., UE 120), a BS (e.g., BS 110), an AMF device (e.g., network controller 130), an SMF device (e.g., network controller 130), a PCF device (e.g., network controller 130), a UPF device (e.g., network controller 130), an NEF device (e.g., network controller 130), an application server (e.g., application server 140), and/or the like. In some aspects, examples 700 may include different quantities and/or configurations of the devices illustrated in FIGS. 7A and 7B. In some aspects, the AMF device, SMF device, PCF device, UPF device, and NEF device may be included in a core network of a wireless network (e.g., wireless network 100), such as a 5G/NR core network (e.g., an NG Core).

In some aspects, the application server may host one or more applications, store information associated with the one or more applications, transmit and/or receive application traffic associated with the one or more applications, and/or the like. The application traffic may include various types of periodic traffic, such as voice traffic, video traffic, virtual reality traffic, augmented reality traffic, heartbeat signals, gaming traffic, and/or the like. In some aspects, the application traffic may include a non-TSC that is not carried over a delay critical GBR type of QoS flow.

In some aspects, the application server, the devices included in the core network, the BS, and/or the UE may coordinate to synchronize and/or align a traffic cycle, for application traffic associated with the application server, and a DRX cycle and/or an SPS cycle associated with the UE, in order to reduce, mitigate, and/or eliminate the effects of the transmission delays that accumulate along the communication path between the application server and the UE.

As shown in FIG. 7A, and by reference number 702, the application server may transmit, to the NEF device, a first request for a DRX configuration and/or an SPS configuration associated with the UE. In some aspects, the application server may transmit the first request based at least in part on determining that the application server is to transmit application traffic to the UE. In some aspects, the NEF device may forward the first request to other devices included in the core network, such as the PCF device and/or the like.

As further shown in FIG. 7A, and by reference number 704, the PCF device may receive the first request and may initiate and/or establish a QoS flow for the application traffic. As indicated above, the QoS flow for the application traffic may be a non delay critical and/or non-GBR type of QoS flow. In some aspects, the QoS flow may include one or more QoS parameters, such as a priority level, a permitted packet delay budget, a permitted packet error rate, and/or the like. The one or more QoS parameters may be based at least in part on a traffic type associated with the application. For example, the one or more QoS parameters may be associated with particular values if the application traffic is voice traffic, may be associated with other particular values if the application traffic is video traffic, and/or the like.

As further shown in FIG. 7A, and by reference number 706, the PCF device may transmit, to the BS, the first request and a second request for a traffic offset between the BS and the application server (e.g., a transmission delay or latency between the BS and the application server). In some aspects, the PCF device may transmit the first request and the second request to the BS via the AMF device, via the SMF device, and/or the like. In some aspects, the PCF device may transmit the first request and the second request based at least in part on initiating the QoS flow. In some aspects, the AMF device and/or the SMF device may transmit the first request and the second request to the BS via an N2 interface and/or another type of interface.

As further shown in FIG. 7A, and by reference number 708, the BS may receive the first request and the second request, and may determine the traffic offset based at least in part on receiving the first request and the second request. In some aspects, the BS may determine the traffic offset by performing one or more measurements associated with a user plane communication link between the application server and the BS (e.g., the communication link that includes the UPF device). For example, the BS may perform one or more downlink traffic measurements to determine a downlink traffic offset between the application server and the BS, may perform one or more uplink traffic measurements to determine an uplink offset between the application server and the BS, and/or the like. The first offset and the second offset may account for the various types of transmission delays along the communication path between the UE and the application server, such as Internet delay, backhaul delay, and/or the like, in order to synchronize and/or align a DRX cycle and/or an SPS cycle of the UE with a traffic cycle of the application traffic. In some aspects, the one or more measurements may include RTT measurements, latency measurements, and/or the like.

As shown in FIG. 7B, and by reference number 710, the BS may transmit an indication of the traffic offset and an indication of the DRX configuration and/or the SPS configuration to the application server. In some aspects, the BS may transmit the indication of the traffic offset and/or the indication of the DRX configuration and/or the SPS configuration to the application server via the AMF device, SMF device, PCF device, NEF device, and/or the like. In some aspects, the BS may transmit the indication of the traffic offset and/or the indication of the DRX configuration and/or the SPS configuration based at least in part on determining the traffic offset.

In some aspects, the indication of the DRX configuration may include an indication of a DRX cycle duration associated with the DRX cycle of the UE, an indication of a DRX offset associated with the DRX cycle of the UE, and/or the like. In some aspects, the indication of the SPS configuration may include an indication of an SPS grant size associated with the SPS cycle of the UE, and/or the like. In some aspects, the indication of the traffic offset may include an indication of the downlink traffic offset determined by the BS and/or an indication of the uplink traffic offset determined by the BS.

As further shown in FIG. 7B, and by reference number 712, the application server may adjust a traffic pattern associated with the application traffic of the application server. In some aspects, the traffic pattern may specify a traffic cycle associated with the application traffic (e.g., a length of a time period between traffic bursts of the application traffic), a traffic burst size associated with the application traffic (e.g., a size of bursts of application traffic transmitted from the application server), a starting time or phase of the application traffic, and/or the like. In some aspects, the application server may adjust one or more of these parameters based at least in part on the DRX configuration and/or the SPS configuration associated with the UE, based at least in part on the traffic offset between the application server and the BS, and/or the like. For example, the application server may adjust the traffic cycle, traffic burst size, and/or the starting time or phase based at least in part on the traffic offset, based at least in part on the DRX cycle duration, based at least in part on the SPS grant size, based at least in part on the DRX offset, and/or the like.

As further shown in FIG. 7B, and by reference number 714, the UE and the application server may transmit and/or receive application data, associated with the application server, based at least in part on the DRX configuration and/or the SPS configuration and the adjusted traffic pattern for the application traffic. For example, the UE may transition in and out of a sleep or idle mode to receive application traffic from the application server based at least in part on the DRX configuration, may transmit application traffic to the application server based at least in part on the SPS configuration, and/or the like. As another example, the application server may transmit application traffic to the UE according to the adjusted traffic pattern.

In this way, the application server may adjust a traffic cycle, for the application traffic associated with the application server, based at least in part on a DRX cycle and/or an SPS cycle associated with the UE, based at least in part on a traffic offset between the application server and the BS, and/or the like. In this way, the traffic pattern and the DRX cycle and/or SPS cycle may be synchronized and/or aligned such that the UE wakes up from a sleep period to monitor for downlink traffic when the application server is transmitting application traffic to UE, such that the UE is in a sleep period when the application server is not transmitting application traffic to the UE, such that the UE is permitted to transmit application traffic to the application server without delay, and/or the like. This reduces lost or dropped application traffic, reduces retransmissions of application traffic, reduces delays in the transmission of application traffic from the UE to the application server, and reduces consumption of processing and/or memory resources of the UE caused by misalignment between the traffic cycle of the application traffic and the DRX cycle of the UE and/or the SPS cycle of the UE.

As indicated above, FIGS. 7A and 7B are provided as examples. Other examples may differ from what is described with respect to FIGS. 7A and 7B.

Figure 8A:
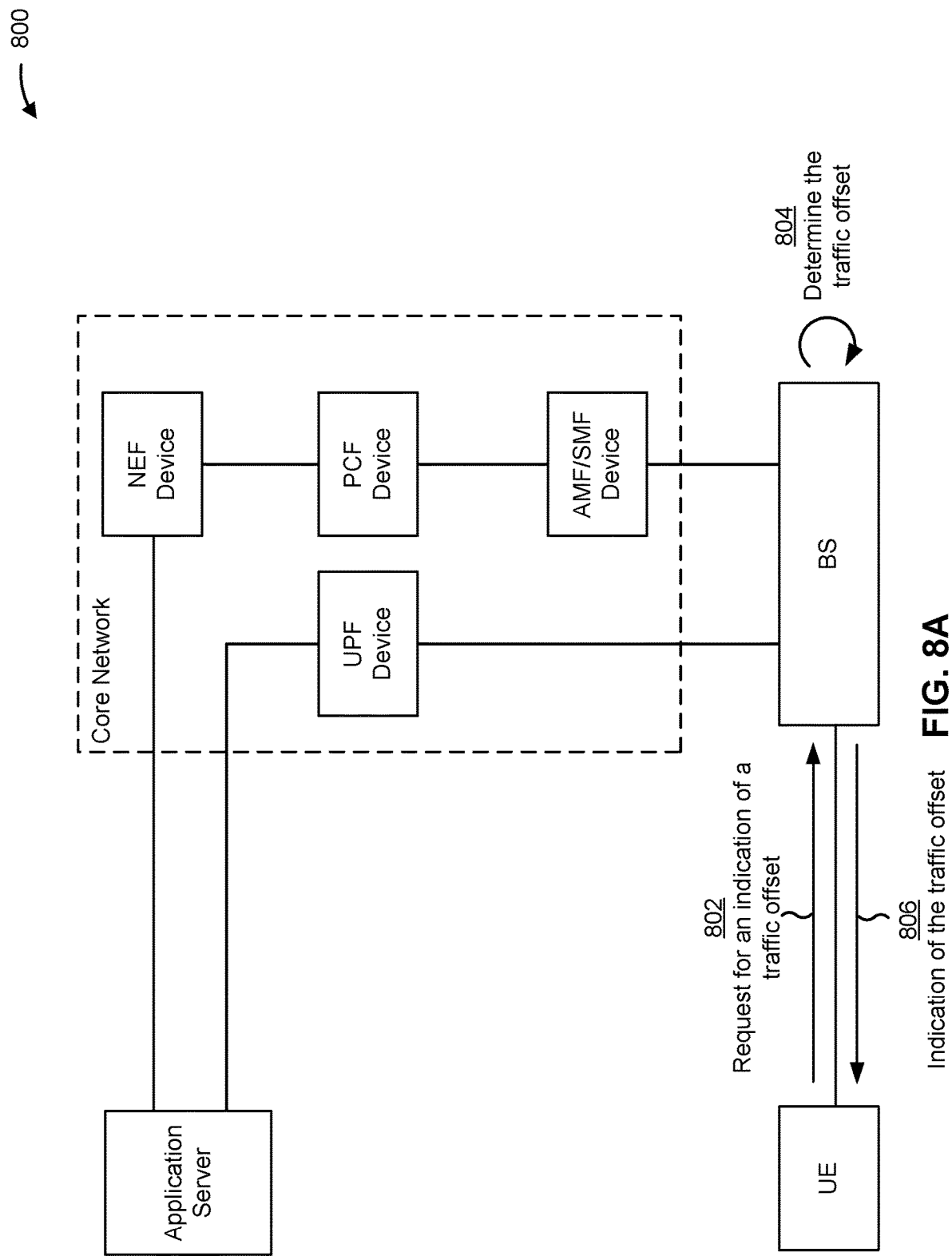
Figure 8B:
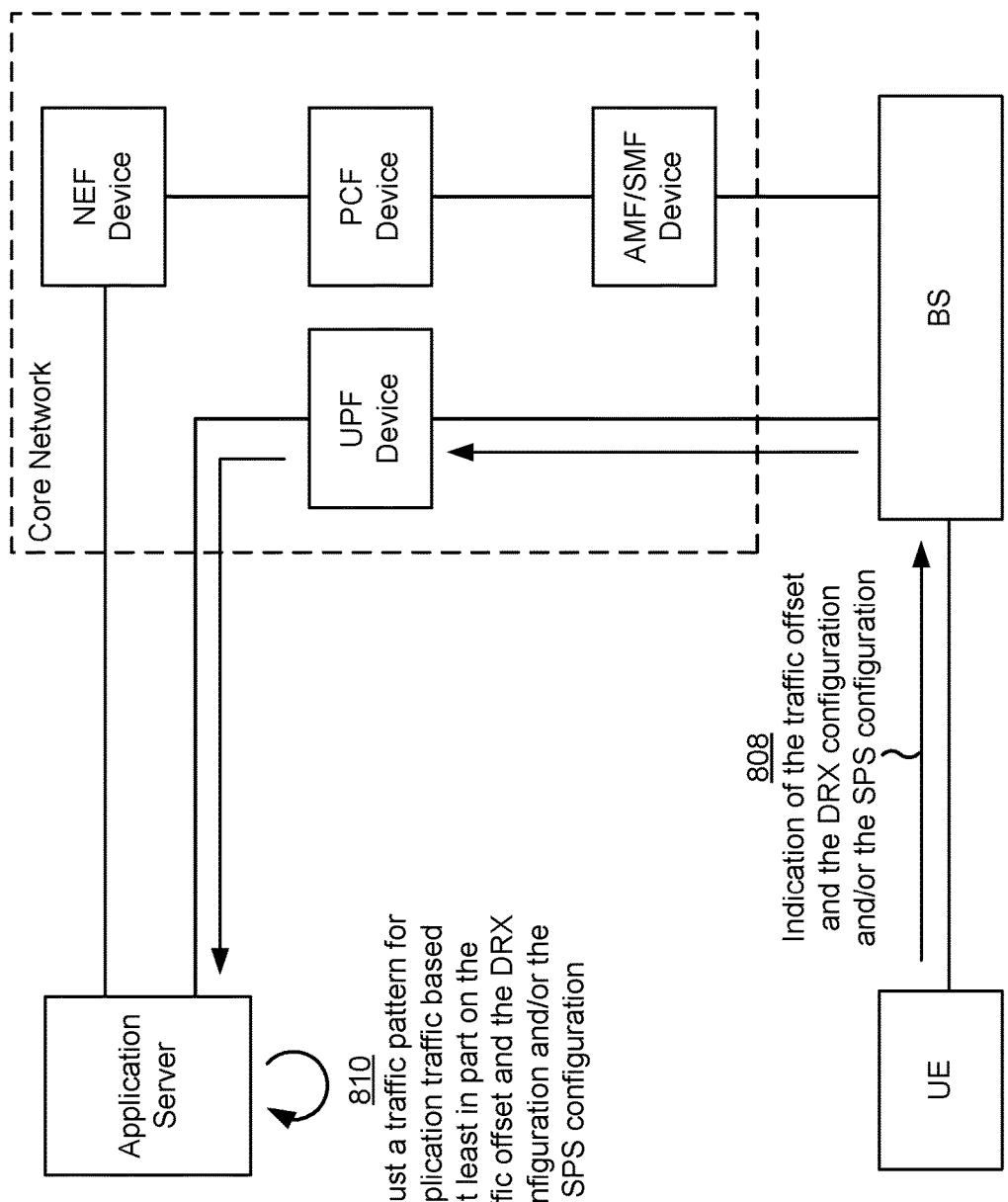
Figure 8C:
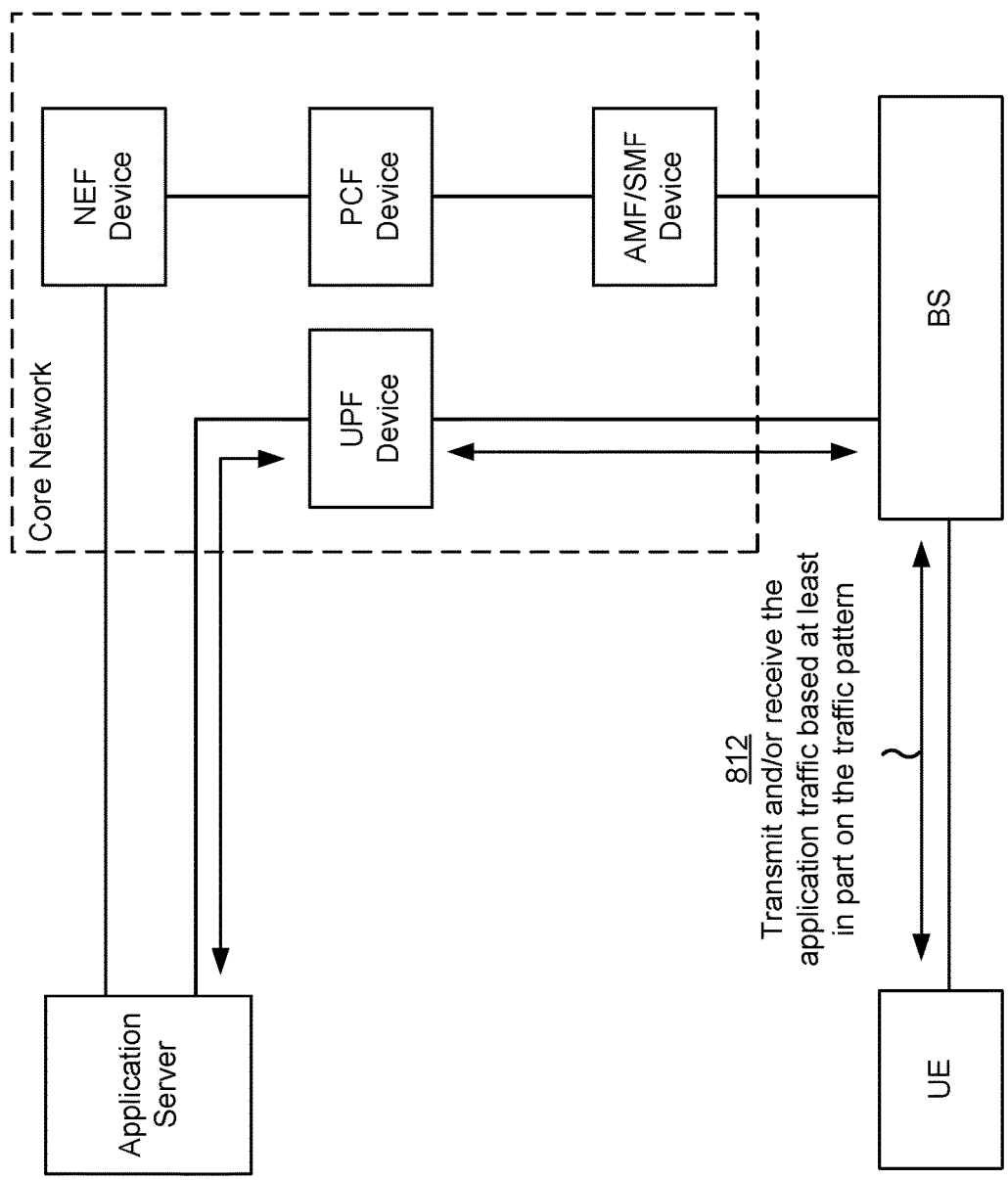

FIGS. 8A-8C are diagrams illustrating examples 800 of synchronization of traffic and DRX and/or SPS, in accordance with various aspects of the present disclosure. As shown in FIGS. 8A-8C, examples 800 may include one or more devices, such as a UE (e.g., UE 120), a BS (e.g., BS 110), an AMF device (e.g., network controller 130), an SMF device (e.g., network controller 130), a PCF device (e.g., network controller 130), a UPF device (e.g., network controller 130), an NEF device (e.g., network controller 130), an application server (e.g., application server 140), and/or the like. In some aspects, examples 800 may include different quantities and/or configurations of the devices illustrated in FIGS. 8A-8C. In some aspects, the AMF device, SMF device, PCF device, UPF device, and NEF device may be included in a core network of a wireless network (e.g., wireless network 100), such as a 5G/NR core network (e.g., an NG Core).

In some aspects, the application server may host one or more applications, store information associated with the one or more applications, transmit and/or receive application traffic associated with the one or more applications, and/or the like. The application traffic may include various types of periodic traffic, such as voice traffic, video traffic, virtual reality traffic, augmented reality traffic, heartbeat signals, gaming traffic, and/or the like. In some aspects, the application traffic may include a non-TSC that is not carried over a delay critical GBR type of QoS flow.

In some aspects, the application server, the devices included in the core network, the BS, and/or the UE may coordinate to synchronize and/or align a traffic cycle, for application traffic associated with the application server, and a DRX cycle and/or an SPS cycle associated with the UE, in order to reduce, mitigate, and/or eliminate the effects of the transmission delays that accumulate along the communication path between the application server and the UE.

As shown in FIG. 8A, and by reference number 802, the UE may transmit, to the BS, a request for a traffic offset between the BS and the application server (e.g., a transmission delay or latency between the BS and the application server). In some aspects, the UE may further transmit, to the BS, a request for a DRX configuration and/or an SPS configuration associated with the UE. In some aspects, the request for the traffic offset and/or the request for a DRX configuration/SPS configuration may be generated by and provided from an application client of the UE to a modem of the UE (e.g., a receive processor 258, a transmit processor 264, a controller/processor 280, and/or another processing component). The modem may receive the request(s) and may provide the request(s) to a transmit chain of the UE (e.g., a TX MIMO processor 266, a MOD 254, an antenna 252, and/or other components), which may transmit the request(s) to the BS.

As further shown in FIG. 8A, and by reference number 804, the BS may receive the request and may determine the traffic offset based at least in part on receiving the request. In some aspects, the BS may determine the traffic offset by performing one or more measurements associated with a user plane communication link between the application server and the BS (e.g., the communication link that includes the UPF device). For example, the BS may perform one or more downlink traffic measurements to determine a downlink traffic offset between the application server and the BS, may perform one or more uplink traffic measurements to determine an uplink offset between the application server and the BS, and/or the like. The first offset and the second offset may account for the various types of transmission delays along the communication path between the UE and the application server, such as Internet delay, backhaul delay, and/or the like, in order to synchronize and/or align a DRX cycle and/or an SPS cycle of the UE with a traffic cycle of the application traffic. In some aspects, the one or more measurements may include RTT measurements, latency measurements, and/or the like.

As further shown in FIG. 8A, and by reference number 806, the BS may transmit an indication of the traffic offset to the UE. In some aspects, the BS may further transmit an indication of the DRX configuration and/or the SPS configuration associated with the UE. In some aspects, a receive chain of the UE (e.g., an antenna 252, a DEMOD 254, a MIMO detector 256, and/or other components) may receive the indication of the DRX configuration and/or the SPS configuration and may provide the indication to the modem of the UE. The modem may provide the indication of the DRX configuration and/or the SPS configuration to the application client of the UE.

In some aspects, the indication of the DRX configuration may include an indication of a DRX cycle duration associated with the DRX cycle of the UE, an indication of a DRX offset associated with the DRX cycle of the UE, and/or the like. In some aspects, the indication of the SPS configuration may include an indication of an SPS grant size associated with the SPS cycle of the UE, and/or the like. In some aspects, the indication of the traffic offset may include an indication of the downlink traffic offset determined by the BS and/or an indication of the uplink traffic offset determined by the BS.

As shown in FIG. 8B, and by reference number 808, the UE may transmit the indication of the traffic offset and the indication of the DRX configuration and/or the SPS configuration to the application server. For example, the UE may transmit the indication of the traffic offset and the indication of the DRX configuration and/or the SPS configuration to the application server via the UPF device and/or other devices included in the wireless network and/or other networks.

As further shown in FIG. 8B, and by reference number 810, the application server may adjust a traffic pattern associated with the application traffic of the application server. In some aspects, the traffic pattern may specify a traffic cycle associated with the application traffic (e.g., a length of a time period between traffic bursts of the application traffic), a traffic burst size associated with the application traffic (e.g., a size of bursts of application traffic transmitted from the application server), a starting time or phase of the application traffic, and/or the like. In some aspects, the application server may adjust one or more of these parameters based at least in part on the DRX configuration and/or the SPS configuration associated with the UE, based at least in part on the traffic offset between the application server and the BS, and/or the like. For example, the application server may adjust the traffic cycle, traffic burst size, and/or the starting time or phase based at least in part on the traffic offset, based at least in part on the DRX cycle duration, based at least in part on the SPS grant size, based at least in part on the DRX offset, and/or the like.

As shown in FIG. 8C, and by reference number 812, the UE and the application server may transmit and/or receive application data, associated with the application server, based at least in part on the DRX configuration and/or the SPS configuration and the adjusted traffic pattern for the application traffic. For example, the UE may transition in and out of a sleep or idle mode to receive application traffic from the application server based at least in part on the DRX configuration, may transmit application traffic to the application server based at least in part on the SPS configuration, and/or the like. As another example, the application server may transmit application traffic to the UE according to the adjusted traffic pattern.

In this way, the application server may adjust a traffic cycle, for the application traffic associated with the application server, based at least in part on a DRX cycle and/or an SPS cycle associated with the UE, based at least in part on a traffic offset between the application server and the BS, and/or the like. In this way, the traffic pattern and the DRX cycle and/or SPS cycle may be synchronized and/or aligned such that the UE wakes up from a sleep period to monitor for downlink traffic when the application server is transmitting application traffic to UE, such that the UE is in a sleep period when the application server is not transmitting application traffic to the UE, such that the UE is permitted to transmit application traffic to the application server without delay, and/or the like. This reduces lost or dropped application traffic, reduces retransmissions of application traffic, reduces delays in the transmission of application traffic from the UE to the application server, and reduces consumption of processing and/or memory resources of the UE caused by misalignment between the traffic cycle of the application traffic and the DRX cycle of the UE and/or the SPS cycle of the UE.

As indicated above, FIGS. 8A-8C are provided as examples. Other examples may differ from what is described with respect to FIGS. 8A-8C.

Figure 9:
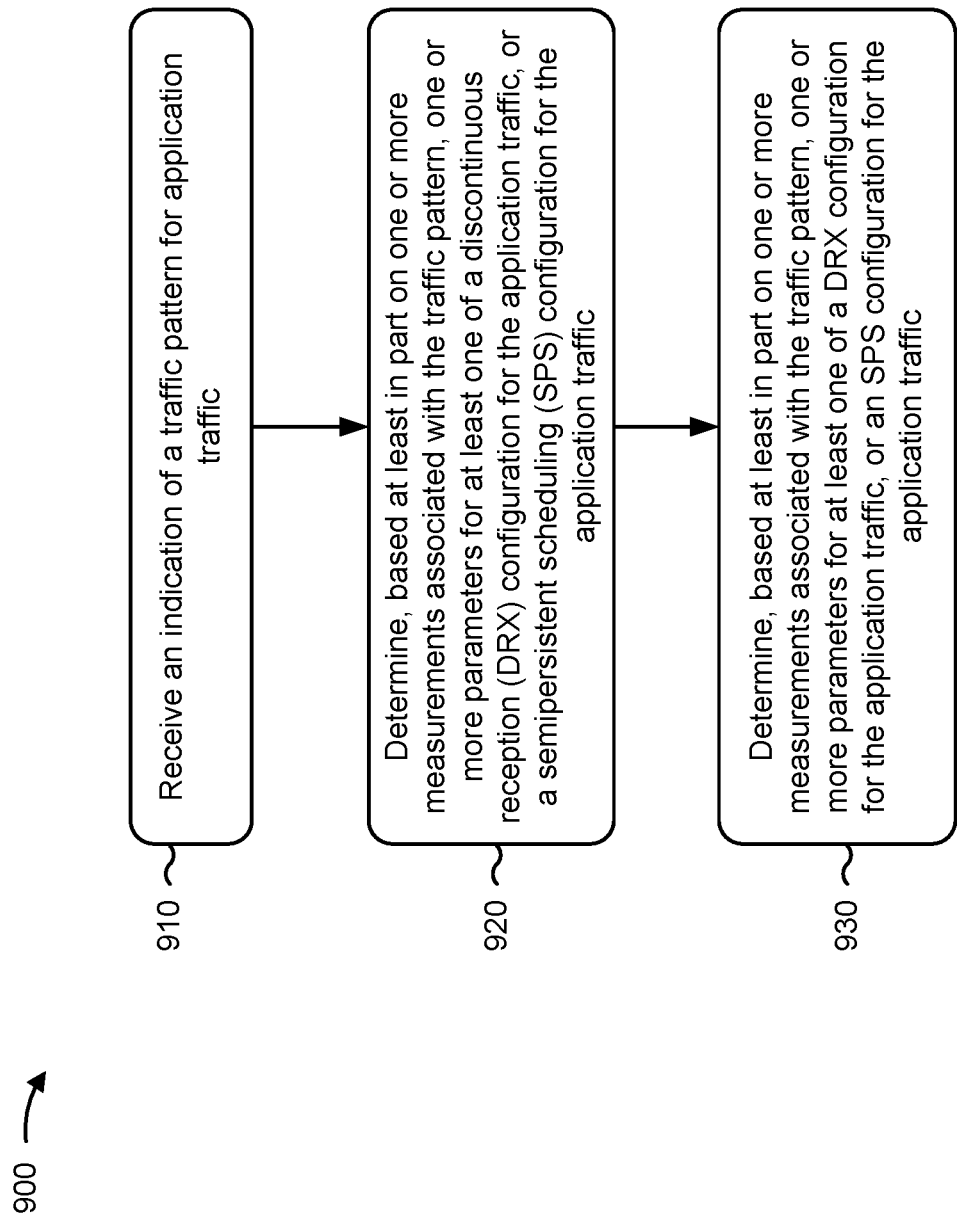
FIG. 9 is a diagram illustrating an example process performed, for example, by a base station (BS), in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110) performs operations associated with synchronization of traffic and DRX and/or SPS.

As shown in FIG. 9, in some aspects, process 900 may include receiving an indication of a traffic pattern for application traffic (block 910). For example, the BS (e.g., using transmit processor 220, receive processor 238, controller/processor 240, memory 242, and/or the like) may receive an indication of a traffic pattern for application traffic, as described above.

As further shown in FIG. 9, in some aspects, process 900 may include determining, based at least in part on one or more measurements associated with the traffic pattern, one or more parameters for at least one of a DRX configuration for the application traffic or an SPS configuration for the application traffic (block 920). For example, the BS (e.g., using transmit processor 220, receive processor 238, controller/processor 240, memory 242, and/or the like) may determine, based at least in part on one or more measurements associated with the traffic pattern, one or more parameters for at least one of a DRX configuration for the application traffic or an SPS configuration for the application traffic, as described above.

As further shown in FIG. 9, in some aspects, process 900 may include transmitting, to a UE that is to receive the application traffic, an indication of the at least one of the DRX configuration or the SPS configuration (block 930). For example, the BS (e.g., using transmit processor 220, receive processor 238, controller/processor 240, memory 242, and/or the like) may transmit, to a UE that is to receive the application traffic, an indication of the at least one of the DRX configuration or the SPS configuration, as described above.

Process 900 may include additional aspects, such as any single aspect or any combination of aspects described below and/or in connection with one or more other processes described elsewhere herein.

In a first aspect, the application traffic is periodic, non-TSC, and is not carried over a delay critical GBR type of QoS flow. In a second aspect, alone or in combination with the first aspect, the traffic pattern comprises at least one of a traffic cycle associated with the application traffic, a traffic burst size associated with the application traffic, or a starting time or phase of the application traffic. In a third aspect, alone or in combination with one or more of the first and second aspects, receiving the indication of the traffic pattern for the application traffic comprises receiving the indication of the traffic pattern via at least one of an NEF device, a PCF device, an AMF device, or an SMF device.

In a fourth aspect, alone or in combination with one or more of the first through third aspects, receiving the indication of the traffic pattern for the application traffic comprises receiving the indication of the traffic pattern in a QoS profile associated with a QoS flow for the application traffic. In a fifth aspect, alone or in combination with one or more of the first through fourth aspects, the one or more parameters comprise at least one of: a first offset between a traffic cycle associated with the application traffic and a DRX cycle associated with the UE, a second offset between the traffic cycle associated with the application traffic and an SPS cycle associated with the UE, a traffic burst size for the application traffic, an SPS grant size, or a starting time of the application traffic. In a sixth aspect, alone or in combination with one or more of the first through fifth aspects, process 900 further comprises performing the one or more measurements associated with the traffic pattern, and the one or more measurements comprise at least one of one or more downlink traffic measurements associated with the traffic pattern, or one or more uplink traffic measurements associated with the traffic pattern.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
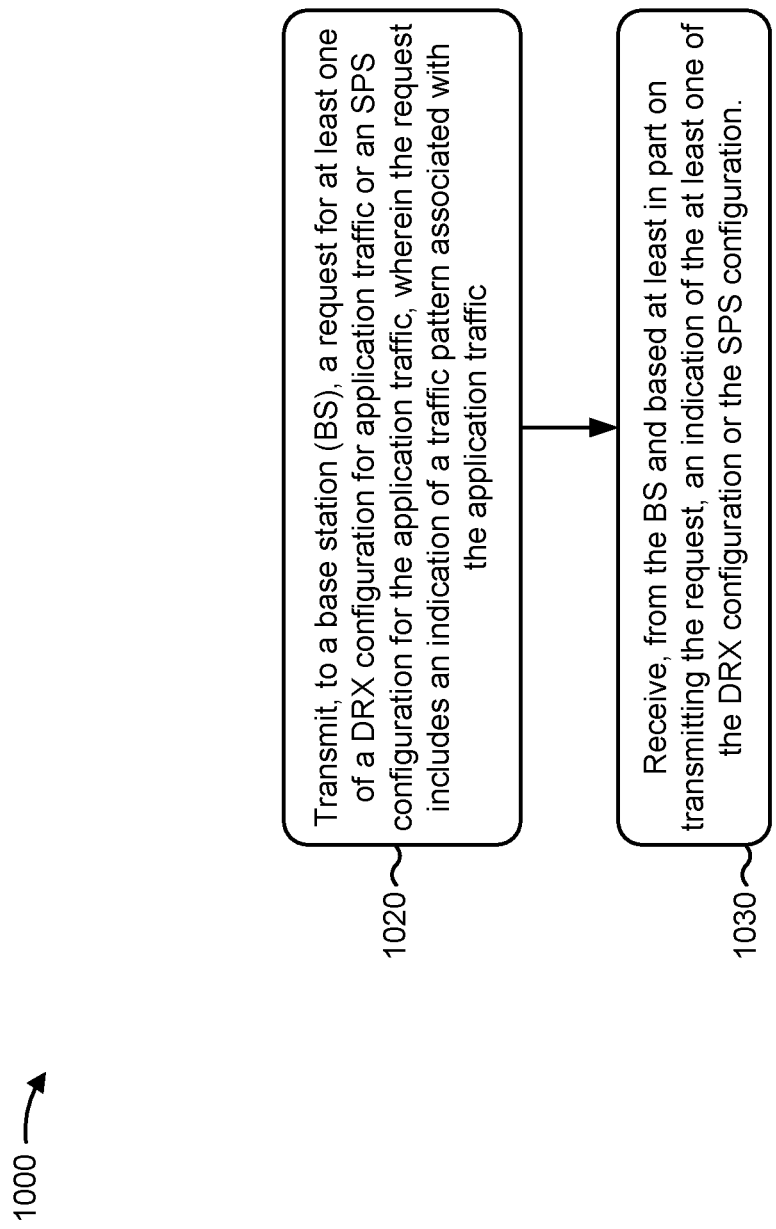
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs operations associated with synchronization of traffic and DRX and/or SPS.

As further shown in FIG. 10, in some aspects, process 1000 may include transmitting, to a BS, a request for at least one of a DRX configuration for application traffic or an SPS configuration for the application traffic, wherein the request includes an indication of a traffic pattern associated with the application traffic (block 1020). For example, the UE (e.g., using receive processor 258, transmit processor 264, controller/processor 280, memory 282, and/or the like) may transmit, to a BS, a request for at least one of a DRX configuration for application traffic or an SPS configuration for the application traffic, as described above. In some aspects, the request includes an indication of a traffic pattern associated with the application traffic.

As further shown in FIG. 10, in some aspects, process 1000 may include receiving, from the BS and based at least in part on transmitting the request, an indication of the at least one of the DRX configuration or the SPS configuration (block 1030). For example, the UE (e.g., using receive processor 258, transmit processor 264, controller/processor 280, memory 282, and/or the like) may receive, from the BS and based at least in part on transmitting the request, an indication of the at least one of the DRX configuration or the SPS configuration, as described above.

Process 1000 may include additional aspects, such as any single aspect or any combination of aspects described below and/or in connection with one or more other processes described elsewhere herein.

In a first aspect, the application traffic is periodic, non-TSC, and is not carried over a GBR QoS flow. In a second aspect, alone or in combination with the first aspect, the traffic pattern comprises at least one of a traffic cycle associated with the application traffic, a traffic burst size associated with the application traffic, or a starting time of the application traffic. In a third aspect, alone or in combination with one or more of the first and second aspects, the at least one of the DRX configuration or the SPS configuration comprises at least one of a first offset between a traffic cycle associated with the application traffic and a DRX cycle associated with the UE, a second offset between the traffic cycle associated with the application traffic and an SPS cycle associated with the UE, a traffic burst size for the application traffic, an SPS grant size, or a starting time of the application traffic. In a fourth aspect, alone or in combination with one or more of the first through third aspects, transmitting the request comprises transmitting the request in an RRC communication, or transmitting the request in a MAC-CE communication.

In a fifth aspect, alone or in combination with one or more of the first through fourth aspects, process 1000 includes initiating a QoS flow for the application traffic and transmitting the request based at least in part on initiating the QoS flow. In a sixth aspect, alone or in combination with one or more of the first through fifth aspects, the at least one of the DRX configuration or the SPS configuration is based at least in part on the traffic pattern associated with the application traffic. In a seventh aspect, alone or in combination with one or more of the first through sixth aspects, process 1000 includes providing the request from an application client of the UE to a modem of the UE and providing the indication from the modem to the application client.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
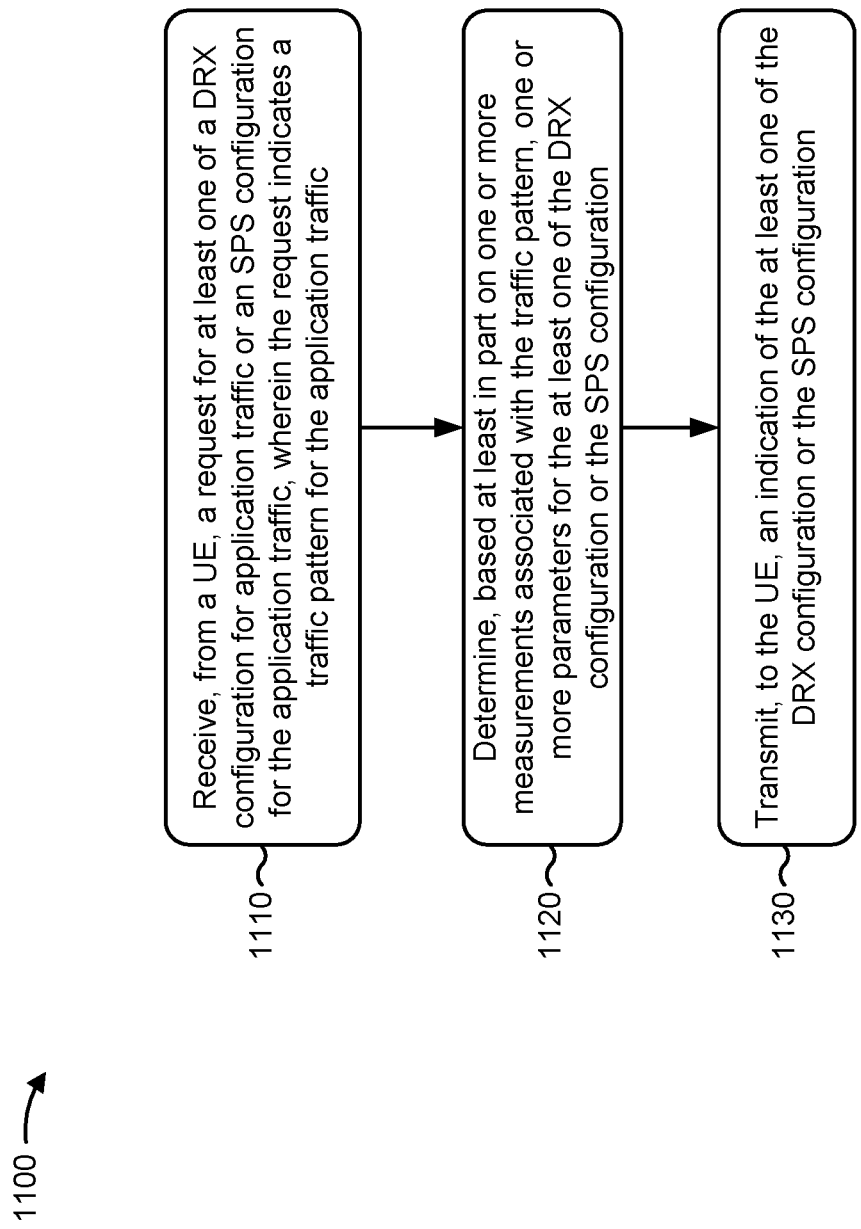
FIG. 11 is a diagram illustrating an example process performed, for example, by a BS, in accordance with various aspects of the present disclosure.

FIG. 11 is a diagram illustrating an example process 1100 performed, for example, by a BS, in accordance with various aspects of the present disclosure. Example process 1100 is an example where a BS (e.g., BS 110) performs operations associated with synchronization of traffic and DRX and/or SPS.

As shown in FIG. 11, in some aspects, process 1100 may include receiving, from a UE, a request for at least one of a DRX configuration for application traffic or an SPS configuration for the application traffic, wherein the request indicates a traffic pattern for the application traffic (block 1110). For example, the BS (e.g., using transmit processor 220, receive processor 238, controller/processor 240, memory 242, and/or the like) may receive, from a UE, a request for at least one of a DRX configuration for application traffic or an SPS configuration for the application traffic, as described above. In some aspects, the request indicates a traffic pattern for the application traffic.

As further shown in FIG. 11, in some aspects, process 1100 may include determining, based at least in part on one or more measurements associated with the traffic pattern, one or more parameters for the at least one of the DRX configuration or the SPS configuration (block 1120). For example, the BS (e.g., using transmit processor 220, receive processor 238, controller/processor 240, memory 242, and/or the like) may determine, based at least in part on one or more measurements associated with the traffic pattern, one or more parameters for the at least one of the DRX configuration or the SPS configuration, as described above.

As further shown in FIG. 11, in some aspects, process 1100 may include transmitting, to the UE, an indication of the at least one of the DRX configuration or the SPS configuration (block 1130). For example, the BS (e.g., using transmit processor 220, receive processor 238, controller/processor 240, memory 242, and/or the like) may transmit, to the UE, an indication of the at least one of the DRX configuration or the SPS configuration, as described above.

Process 1100 may include additional aspects, such as any single aspect or any combination of aspects described below and/or in connection with one or more other processes described elsewhere herein.

In a first aspect, the application traffic is periodic, non-TSC, and is not carried over a GBR QoS flow. In a second aspect, alone or in combination with the first aspect, the traffic pattern comprises at least one of a traffic cycle associated with the application traffic, a traffic burst size associated with the application traffic, or a starting time of the application traffic. In a third aspect, alone or in combination with one or more of the first and second aspects, the one or more parameters comprise at least one of a first offset between a traffic cycle associated with the application traffic and a DRX cycle associated with the UE, a second offset between the traffic cycle associated with the application traffic and an SPS cycle associated with the UE, a traffic burst size for the application traffic, an SPS grant size, or a starting time of the application traffic.

In a fourth aspect, alone or in combination with one or more of the first through third aspects, process 1100 further comprises performing the one or more measurements associated with the traffic pattern, and the one or more measurements comprise at least one of one or more downlink traffic measurements associated with the traffic pattern, or one or more uplink traffic measurements associated with the traffic pattern. In a fifth aspect, alone or in combination with one or more of the first through fourth aspects, receiving the request comprises receiving the request in an RRC communication, or receiving the request in a MAC-CE communication.

In a sixth aspect, alone or in combination with one or more of the first through fifth aspects, the request includes an indication of a QoS flow associated with the application traffic, and determining the one or more parameters comprises determining the one or more parameters based at least in part on the QoS flow associated with the application traffic. In a seventh aspect, alone or in combination with one or more of the first through sixth aspects, the indication of the QoS flow comprises a QFI associated with the QoS flow.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
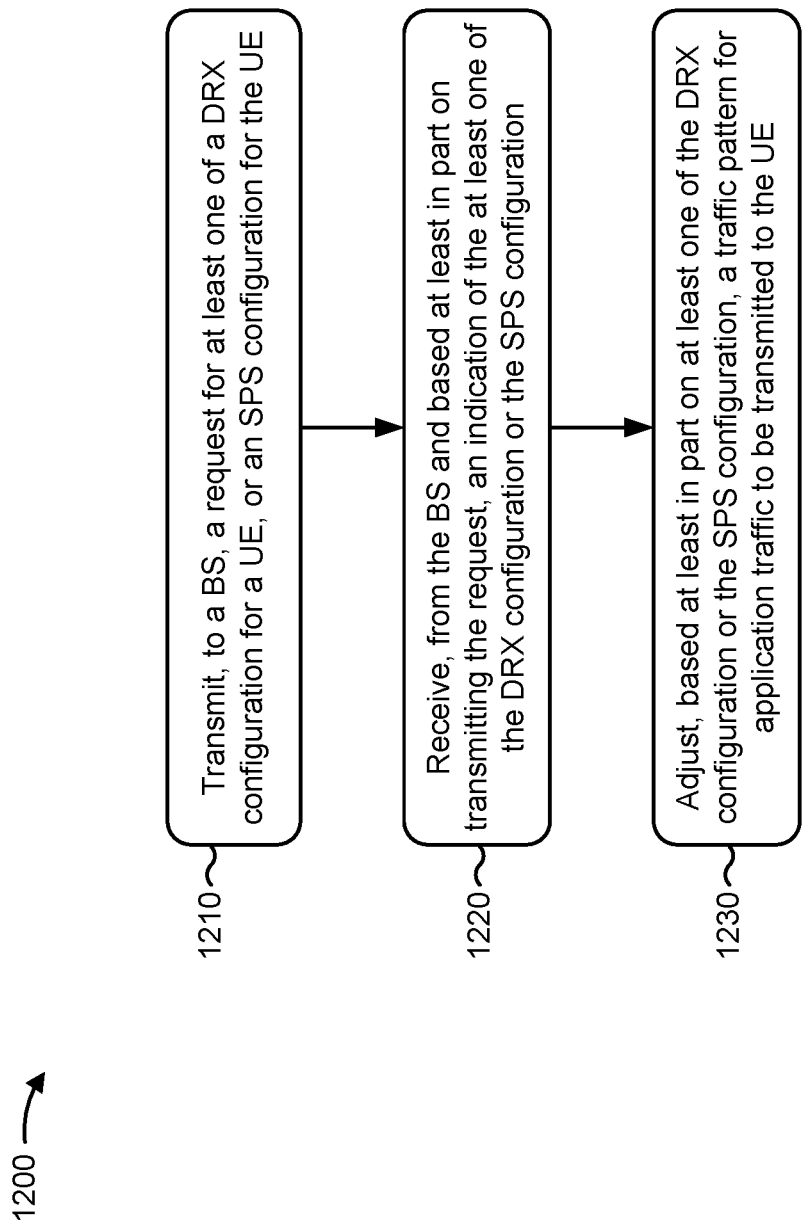
FIG. 12 is a diagram illustrating an example process performed, for example, by an application server, in accordance with various aspects of the present disclosure.

FIG. 12 is a diagram illustrating an example process 1200 performed, for example, by an application server, in accordance with various aspects of the present disclosure. Example process 1200 is an example where an application server (e.g., application server 140) performs operations associated with synchronization of traffic and DRX and/or SPS.

As shown in FIG. 12, in some aspects, process 1200 may include transmitting, to a BS, a request for at least one of a DRX configuration for a UE or an SPS configuration for the UE (block 1210). For example, the application server (e.g., using memory 296, controller/processor 297, communication unit 298, and/or the like) may transmit, to a BS, a request for at least one of a DRX configuration for a UE or an SPS configuration for the UE, as described above.

As further shown in FIG. 12, in some aspects, process 1200 may include receiving, from the BS and based at least in part on transmitting the request, an indication of the at least one of the DRX configuration or the SPS configuration (block 1220). For example, the application server (e.g., using memory 296, controller/processor 297, communication unit 298, and/or the like) may receive, from the BS and based at least in part on transmitting the request, an indication of the at least one of the DRX configuration or the SPS configuration, as described above.

As further shown in FIG. 12, in some aspects, process 1200 may include adjusting, based at least in part on at least one of the DRX configuration or the SPS configuration, a traffic pattern for application traffic to be transmitted to the UE (block 1230). For example, the application server (e.g., using memory 296, controller/processor 297, communication unit 298, and/or the like) may adjust, based at least in part on at least one of the DRX configuration or the SPS configuration, a traffic pattern for application traffic to be transmitted to the UE, as described above.

Process 1200 may include additional aspects, such as any single aspect or any combination of aspects described below and/or in connection with one or more other processes described elsewhere herein.

In a first aspect, the application traffic is periodic, non-TSC, and is not carried over a GBR QoS flow. In a second aspect, alone or in combination with the first aspect, process 1200 further comprises receiving, from the BS and based at least in part on transmitting the request, an indication of a traffic offset between the application server and the BS, and adjusting the traffic pattern comprises adjusting the traffic pattern based at least in part on the traffic offset. In a third aspect, alone or in combination with one or more of the first and second aspects, the traffic offset comprises at least one of a downlink traffic offset between the application server and the BS, or an uplink traffic offset between the application server and the BS.

In a fourth aspect, alone or in combination with one or more of the first through third aspects, the at least one of the DRX configuration or the SPS configuration comprises at least one of a DRX cycle duration, a DRX offset, or an SPS grant size. In a fifth aspect, alone or in combination with one or more of the first through fourth aspects, transmitting the request comprises transmitting the request to the BS via at least one of an NEF device, a PCF device, an AMF device, or an SMF device. In a sixth aspect, alone or in combination with one or more of the first through fifth aspects, receiving the indication of the at least one of the DRX configuration or the SPS configuration comprises receiving the indication of the at least one of the DRX configuration or the SPS configuration from the BS via at least one of an NEF device, a PCF device, an AMF device, or an SMF device.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
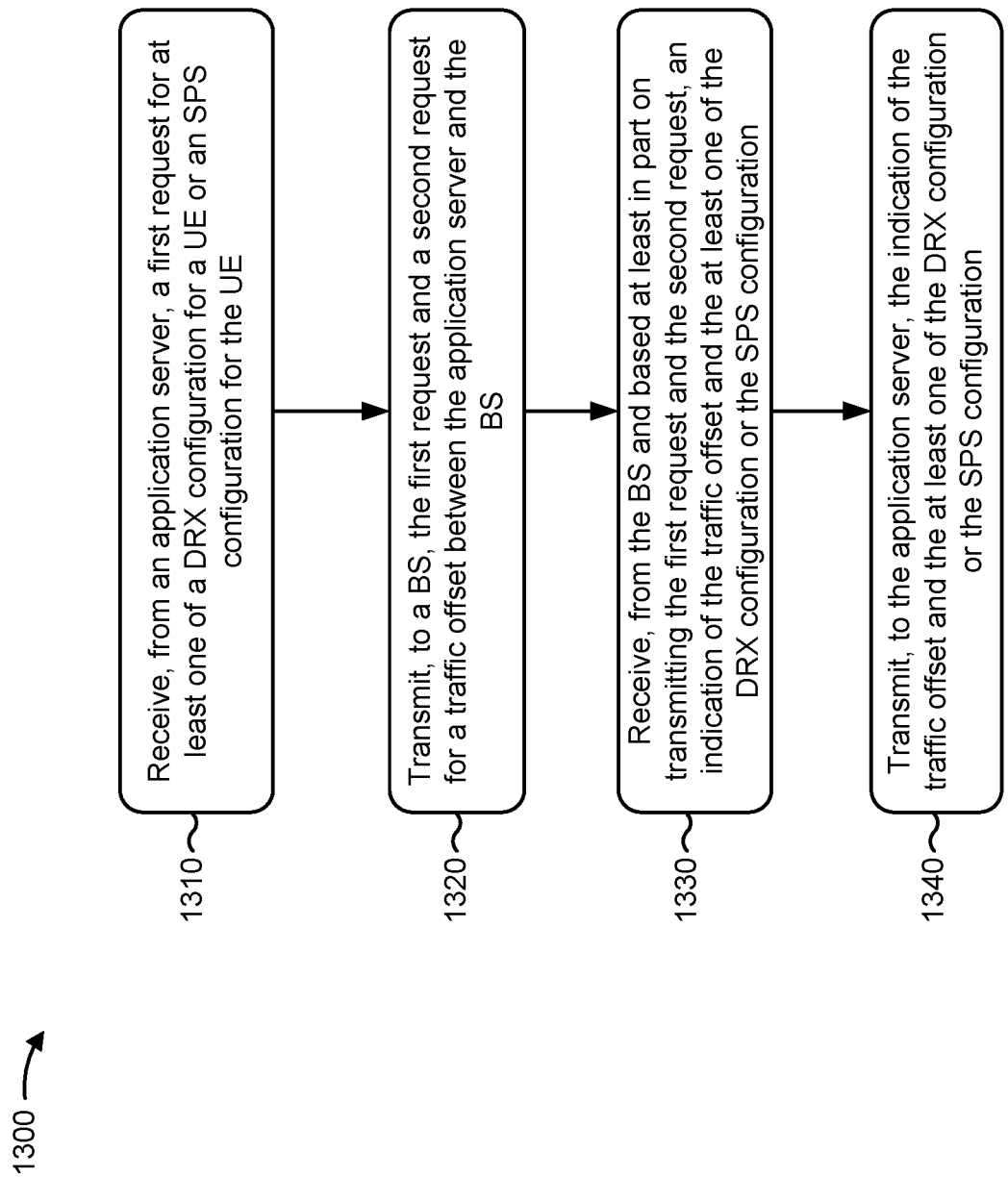
FIG. 13 is a diagram illustrating an example process performed, for example, by a network controller, in accordance with various aspects of the present disclosure.

FIG. 13 is a diagram illustrating an example process 1300 performed, for example, by a network controller, in accordance with various aspects of the present disclosure. Example process 1300 is an example where a network controller (e.g., network controller 130) performs operations associated with synchronization of traffic and DRX and/or SPS.

As shown in FIG. 13, in some aspects, process 1300 may include receiving, from an application server, a first request for at least one of a DRX configuration for a UE or an SPS configuration for the UE (block 1310). For example, the network controller (e.g., using controller/processor 290, memory 292, communication unit 294, and/or the like) may receive, from an application server, a first request for at least one of a DRX configuration for a UE or an SPS configuration for the UE, as described above.

As further shown in FIG. 13, in some aspects, process 1300 may include transmitting, to a BS, the first request and a second request for a traffic offset between the application server and the BS (block 1320). For example, the network controller (e.g., using controller/processor 290, memory 292, communication unit 294, and/or the like) may transmit, to a BS, the first request and a second request for a traffic offset between the application server and the BS, as described above.

As further shown in FIG. 13, in some aspects, process 1300 may include receiving, from the BS and based at least in part on transmitting the first request and the second request, an indication of the traffic offset and the at least one of the DRX configuration or the SPS configuration (block 1330). For example, the network controller (e.g., using controller/processor 290, memory 292, communication unit 294, and/or the like) may receive, from the BS and based at least in part on transmitting the first request and the second request, an indication of the traffic offset and the at least one of the DRX configuration or the SPS configuration, as described above.

As further shown in FIG. 13, in some aspects, process 1300 may include transmitting, to the application server, the indication of the traffic offset and the at least one of the DRX configuration or the SPS configuration (block 1340). For example, the network controller (e.g., using controller/processor 290, memory 292, communication unit 294, and/or the like) may transmit, to the application server, the indication of the traffic offset and the at least one of the DRX configuration or the SPS configuration, as described above.

Process 1300 may include additional aspects, such as any single aspect or any combination of aspects described below and/or in connection with one or more other processes described elsewhere herein.

In a first aspect, the at least one of the DRX configuration or the SPS configuration comprises at least one of a DRX cycle duration, a DRX offset, or an SPS grant size. In a second aspect, alone or in combination with the first aspect, transmitting the first request and the second request comprises transmitting the first request and the second request to the BS via at least one of a PCF device, and AMF device, or an SMF device. In a third aspect, alone or in combination with one or more of the first and second aspects, receiving the indication of the traffic offset and the at least one of the DRX configuration or the SPS configuration comprises receiving the indication of the traffic offset and the at least one of the DRX configuration or the SPS configuration from the BS via at least one of a PCF device, and AMF device, or an SMF device. In a fourth aspect, alone or in combination with one or more of the first through third aspects, the network controller device comprises an NEF device or a PCF device. In a fifth aspect, alone or in combination with one or more of the first through fourth aspects, the traffic offset comprises at least one of a downlink traffic offset between the application server and the BS, or an uplink traffic offset between the application server and the BS.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
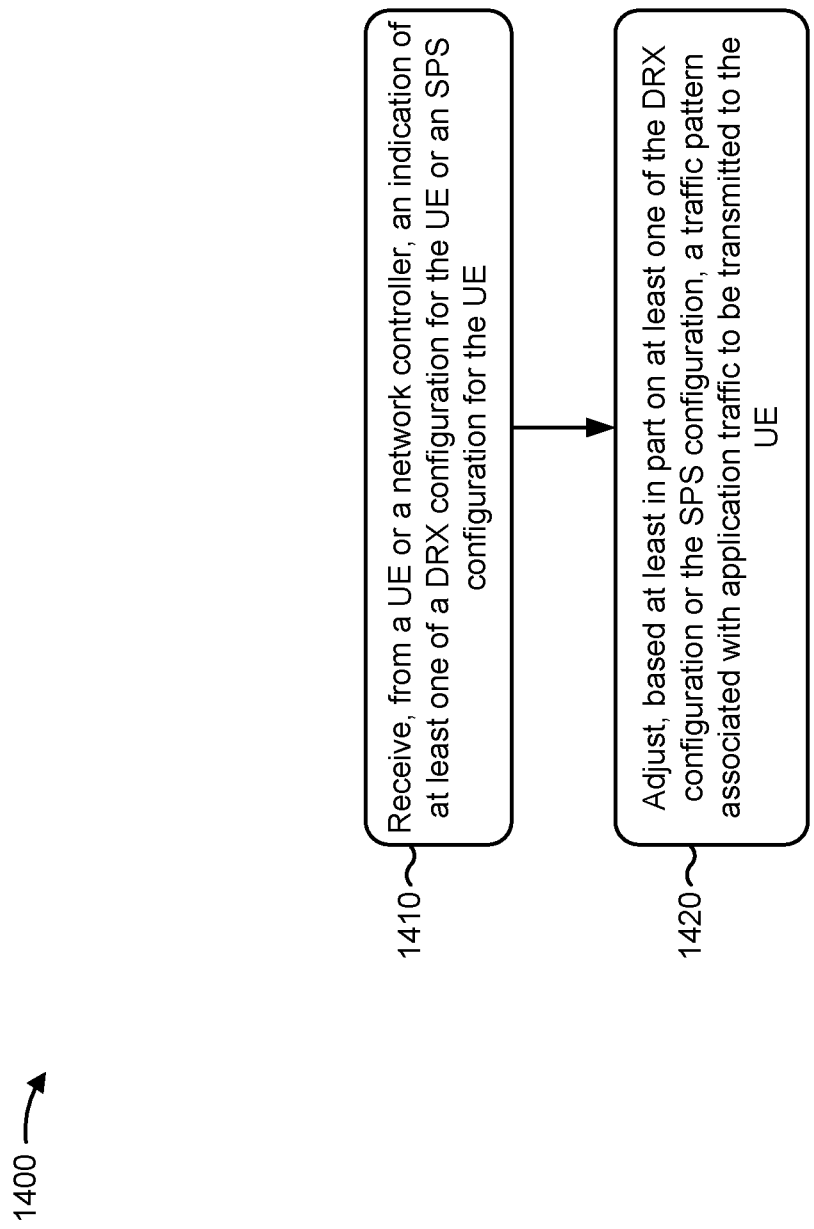
FIG. 14 is a diagram illustrating an example process performed, for example, by an application server, in accordance with various aspects of the present disclosure.

FIG. 14 is a diagram illustrating an example process 1400 performed, for example, by an application server, in accordance with various aspects of the present disclosure. Example process 1400 is an example where an application server (e.g., application server 140) performs operations associated with synchronization of traffic and DRX and/or SPS.

As shown in FIG. 14, in some aspects, process 1400 may include receiving, from a UE or a network controller, an indication of at least one of a DRX configuration associated with the UE or an SPS configuration associated with the UE (block 1410). For example, the application server (e.g., using memory 296, controller/processor 297, communication unit 298, and/or the like) may receive, from a UE or a network controller, an indication of at least one of a DRX configuration associated with the UE or an SPS configuration associated with the UE, as described above.

As further shown in FIG. 14, in some aspects, process 1400 may include adjusting, based at least in part on at least one of the DRX configuration or the SPS configuration, a traffic pattern associated with application traffic to be transmitted to the UE (block 1420). For example, the application server (e.g., using memory 296, controller/processor 297, communication unit 298, and/or the like) may adjust, based at least in part on at least one of the DRX configuration or the SPS configuration, a traffic pattern associated with application traffic to be transmitted to the UE, as described above.

Process 1400 may include additional aspects, such as any single aspect or any combination of aspects described below and/or in connection with one or more other processes described elsewhere herein.

In a first aspect, the application traffic is periodic, non-TSC, and is not carried over a GBR QoS flow. In a second aspect, alone or in combination with the first aspect, adjusting the traffic pattern comprises at least one of: adjusting a traffic cycle associated with the application traffic, adjusting a traffic burst size associated with the application traffic, or adjusting a starting time of the application traffic. In a third aspect, alone or in combination with one or more of the first and second aspects, process 1400 further comprises receiving an indication of at least one of a downlink traffic offset between the application server and the UE, or an uplink traffic offset between the application server and the UE, and adjusting the traffic pattern associated with the application traffic comprises adjusting the traffic pattern based at least in part on the at least one of the downlink traffic offset or the uplink traffic offset.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
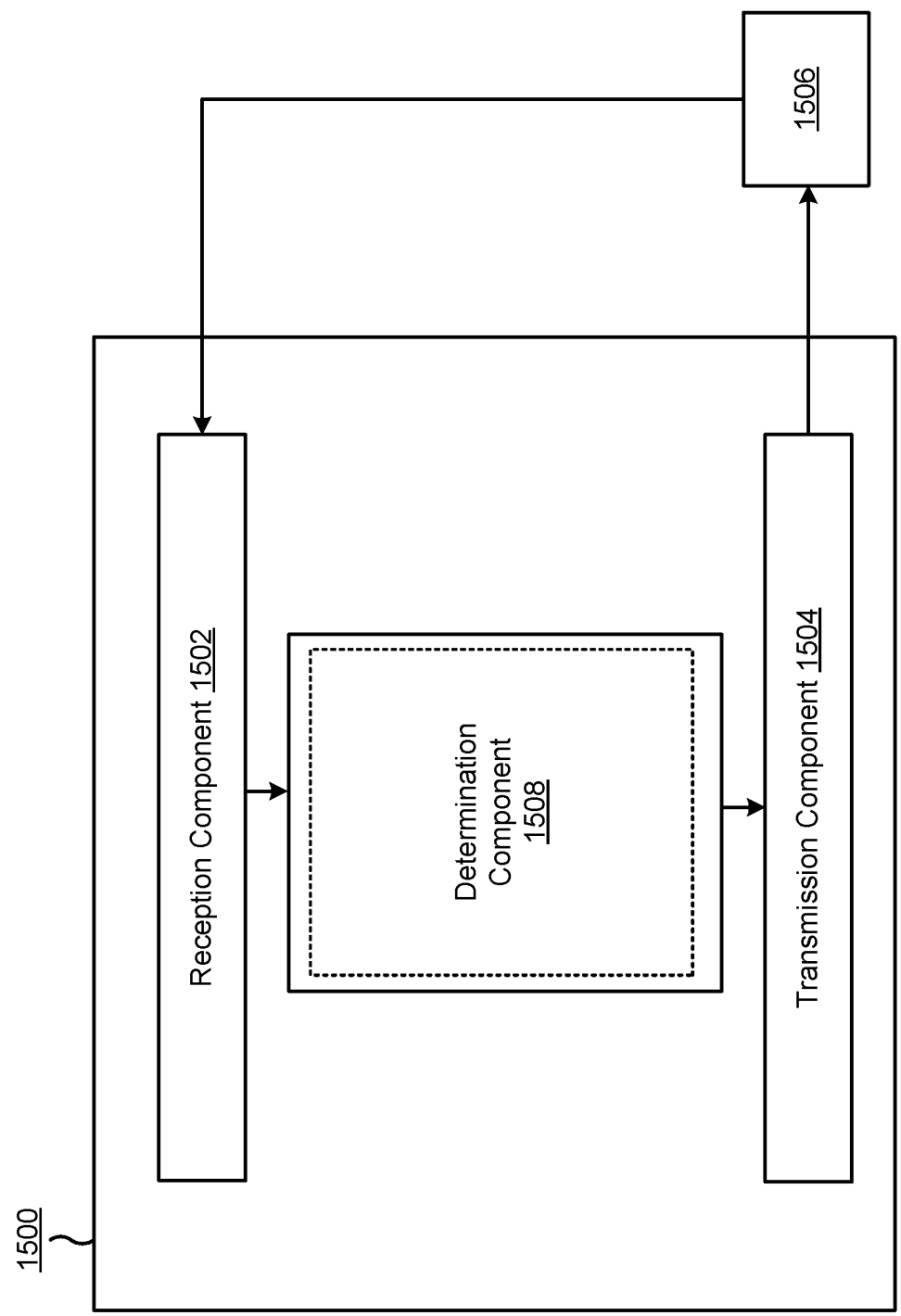
FIGS. 15-17 are block diagrams of example apparatuses for wireless communication in accordance with various aspects of the present disclosure.

FIG. 15 is a block diagram of an example apparatus 1500 for wireless communication. The apparatus 1500 may be BS, or a BS may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, an application server, a network controller, or another wireless communication device) using the reception component 1502 and the transmission component 1504. As further shown, the apparatus 1506 may include one or more of a determination component 1508, among other examples.

In some aspects, the apparatus 1500 may be configured to perform one or more operations described herein in connection with FIGS. 5, 6A, 6B, 7A, 7B, and/or 8A-8C. Additionally or alternatively, the apparatus 1500 may be configured to perform one or more processes described herein, such as process 900 of FIG. 9, process 1100 of FIG. 11, or a combination thereof. In some aspects, the apparatus 1500 and/or one or more components shown in FIG. 15 may include one or more components of the apparatus described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the apparatus described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the apparatus described above in connection with FIG. 2. In some aspects, the transmission component 1504 may be collocated with the reception component 1502 in a transceiver.

In some aspects the reception component 1502 may receive (e.g., from apparatus 1506) an indication of a traffic pattern for application traffic, the determination component 1508 may determine, based at least in part on one or more measurements associated with the traffic pattern, one or more parameters for at least one of a DRX configuration for the application traffic or an SPS configuration for the application traffic, the transmission component 1504 may transmit, to another apparatus 1506 that is to receive the application traffic, an indication of the at least one of the DRX configuration or the SPS configuration, and/or the like. In some aspects the reception component 1502 may receive (e.g., from apparatus 1506) a request for at least one of a DRX configuration for application traffic or an SPS configuration for the application traffic, wherein the request indicates a traffic pattern for the application traffic, the determination component 1508 may determine, based at least in part on one or more measurements associated with the traffic pattern, one or more parameters for the at least one of the DRX configuration or the SPS configuration, the transmission component 1504 may transmit (e.g., to the apparatus 1506) an indication of the at least one of the DRX configuration or the SPS configuration, and/or the like.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
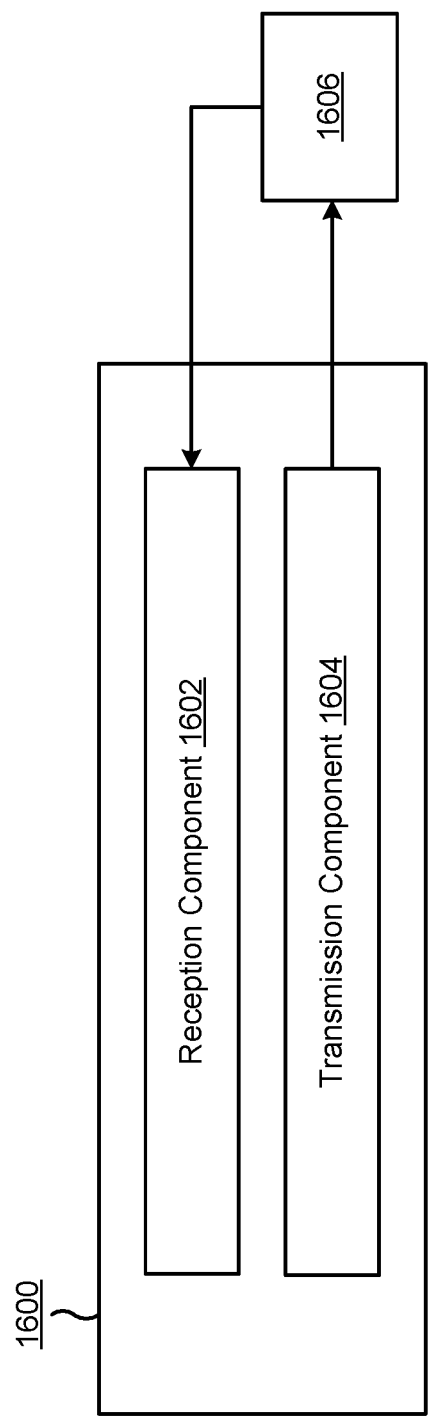

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604.

In some aspects, the apparatus 1600 may be configured to perform one or more operations described herein in connection with FIGS. 5, 6A, 6B, 7A, 7B, and/or 8A-8C. Additionally or alternatively, the apparatus 1600 may be configured to perform one or more processes described herein, such as process 1000 of FIG. 10. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be collocated with the reception component 1602 in a transceiver.

The transmission component 1604 may transmit (e.g., to apparatus 1606), based at least in part on initiating the QoS flow, a request for at least one of a DRX configuration for the application traffic or an SPS configuration for the application traffic, wherein the request includes an indication of a traffic pattern associated with the application traffic. The reception component 1602 may receive (e.g., from the apparatus 1606), based at least in part on transmitting the request, an indication of the at least one of the DRX configuration or the SPS configuration.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
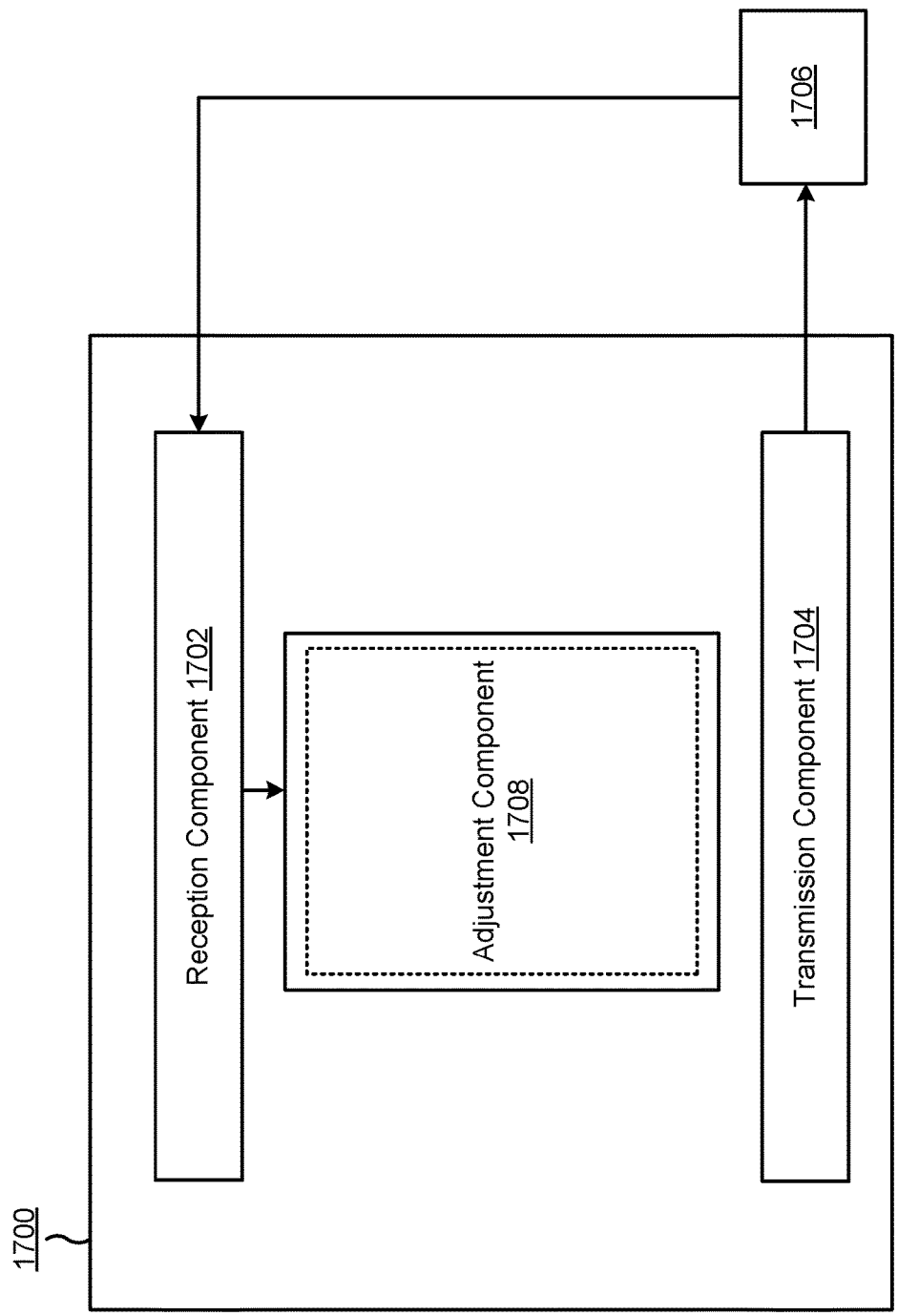

FIG. 17 is a block diagram of an example apparatus 1700 for wireless communication. The apparatus 1700 may be an application server, or an application server may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1706 may include one or more of an adjustment component 1708, among other examples.

In some aspects, the apparatus 1700 may be configured to perform one or more operations described herein in connection with FIGS. 5, 6A, 6B, 7A, 7B, and/or 8A-8C. Additionally or alternatively, the apparatus 1700 may be configured to perform one or more processes described herein, such as process 1400 of FIG. 14, or a combination thereof. In some aspects, the apparatus 1700 and/or one or more components shown in FIG. 17 may include one or more components of the application server described above in connection with FIG. 2. Additionally, or alternatively, one or more components shown in FIG. 17 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the application server described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the application server described above in connection with FIG. 2. In some aspects, the transmission component 1704 may be collocated with the reception component 1702 in a transceiver.

The reception component 1702 may receive (e.g., from apparatus 1706) an indication of at least one of a DRX configuration associated with the apparatus 1706 or an SPS configuration associated with the apparatus 1706. The adjustment component 1708 may adjust, based at least in part on at least one of the DRX configuration or the SPS configuration, a traffic pattern associated with application traffic to be transmitted to the apparatus 1706.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
    receiving, from an application server, an indication of a traffic pattern for application traffic;
    determining, based at least in part on one or more measurements associated with the traffic pattern, one or more parameters for at least one of:
        a discontinuous reception (DRX) configuration for the application traffic,
            wherein the one or more parameters are configured to synchronize the traffic pattern with a DRX cycle of a user equipment (UE) or to synchronize the DRX cycle of the UE with the traffic pattern, or
        a semipersistent scheduling (SPS) configuration for the application traffic,
            wherein the one or more parameters are configured to synchronize the traffic pattern with an SPS cycle of the UE; and
    transmitting, to the UE that is to receive the application traffic, an indication of at least one of the DRX configuration or the SPS configuration.

2. The method of claim 1, wherein the application traffic is periodic, non time sensitive communication (non-TSC), and is not carried over a delay critical guaranteed bit rate (GBR) type of Quality of Service (QoS) flow.

3. The method of claim 1, wherein the traffic pattern comprises at least one of:
    a traffic cycle associated with the application traffic,
    a traffic burst size associated with the application traffic, or
    a starting time or phase of the application traffic.

4. The method of claim 1, wherein receiving the indication of the traffic pattern for the application traffic comprises:
    receiving the indication of the traffic pattern from the application server and via at least one of:
        a network exposure function (NEF) device,
        a policy control function (PCF) device,
        an access and mobility management function (AMF) device, or
        a session management function (SMF) device.

5. The method of claim 1, wherein receiving the indication of the traffic pattern for the application traffic comprises:
    receiving the indication of the traffic pattern in a quality of service (QoS) profile associated with a QoS flow for the application traffic.

6. The method of claim 1, wherein the one or more parameters comprise at least one of:
    a first offset between a traffic cycle associated with the application traffic and the DRX cycle,
    a second offset between the traffic cycle associated with the application traffic and the SPS cycle,
    a traffic burst size for the application traffic,
    an SPS grant size, or
    a starting time of the application traffic.

7. The method of claim 1, further comprising:
    performing the one or more measurements associated with the traffic pattern.

8. The method of claim 7, wherein the one or more measurements comprise at least one of:
    one or more downlink traffic measurements associated with the traffic pattern, or
    one or more uplink traffic measurements associated with the traffic pattern.

9. A method of wireless communication performed by a user equipment (UE), comprising:
    transmitting, to a network entity, a request for at least one of:
        a discontinuous reception (DRX) configuration for application traffic,
            wherein the DRX configuration is to synchronize a traffic pattern associated with the application traffic with a DRX cycle of the UE or to synchronize the DRX cycle of the UE with the traffic pattern, or
        a semipersistent scheduling (SPS) configuration for the application traffic,
            wherein the SPS configuration is to synchronize the traffic pattern with an SPS cycle of the UE; and
    receiving, from the network entity and based at least in part on transmitting the request, an indication of at least one of the DRX configuration or the SPS configuration.

10. The method of claim 9,
    wherein the request is for the DRX configuration, and
    wherein the DRX configuration is based at least in part on the traffic pattern.

11. The method of claim 9, wherein the application traffic is periodic, non time sensitive communication (non-TSC), and is not carried over a guaranteed bit rate (GBR) QoS flow.

12. The method of claim 9, wherein the traffic pattern comprises at least one of:
    a traffic cycle associated with the application traffic,
    a traffic burst size associated with the application traffic, or
    a starting time of the application traffic.

13. The method of claim 9,
    wherein the request is for the DRX configuration, and
    wherein the DRX configuration comprises at least one of:

a first offset between a traffic cycle associated with the application traffic and the DRX cycle,
a traffic burst size for the application traffic, or
a starting time of the application traffic.

14. The method of claim 9, further comprising:
providing the request from an application client of the UE to a modem of the UE; and
providing the indication from the modem to the application client.

15. The method of claim 9, further comprising:
initiating a quality of service (QoS) flow for the application traffic; and
transmitting the request based at least in part on initiating the QoS flow.

16. A method of wireless communication performed by network entity, comprising:
receiving, from a user equipment (UE), a request for at least one of:
a discontinuous reception (DRX) configuration for application traffic, or
a semipersistent scheduling (SPS) configuration for the application traffic,
wherein the request indicates an application server that is to indicate a traffic pattern for the application traffic;
receiving, from the application server, an indication of the traffic pattern for the application traffic;
determining, based at least in part on one or more measurements associated with the traffic pattern, one or more parameters for at least one of the DRX configuration or the SPS configuration,
wherein the one or more parameters are configured to one of:
synchronize the traffic pattern with a DRX cycle of the UE,
synchronize the DRX cycle of the UE with the traffic pattern, or
synchronize the traffic pattern with an SPS cycle of the UE; and
transmitting, to the UE, an indication of at least one of the DRX configuration or the SPS configuration.

17. The method of claim 16, wherein the application traffic is periodic, non time sensitive communication (non-TSC), and is not carried over a guaranteed bit rate (GBR) quality of service (QoS) flow.

18. The method of claim 16, wherein the traffic pattern comprises at least one of:
a traffic cycle associated with the application traffic,
a traffic burst size associated with the application traffic, or
a starting time of the application traffic.

19. The method of claim 16, wherein the one or more parameters comprise at least one of:
a first offset between a traffic cycle associated with the application traffic and the DRX cycle,
a second offset between the traffic cycle associated with the application traffic and the SPS cycle,
a traffic burst size for the application traffic,
an SPS grant size, or
a starting time of the application traffic.

20. The method of claim 16, further comprising:
performing the one or more measurements associated with the traffic pattern.

21. The method of claim 20, wherein the one or more measurements comprise at least one of:
one or more downlink traffic measurements associated with the traffic pattern, or
one or more uplink traffic measurements associated with the traffic pattern.

22. The method of claim 16, wherein receiving the request comprises:
receiving the request in a radio resource control (RRC) communication, or
receiving the request in a medium access control (MAC) control element (MAC-CE) communication.

23. The method of claim 16, wherein the request includes an indication of a quality of service (QoS) flow associated with the application traffic.

24. The method of claim 23, wherein determining the one or more parameters comprises:
determining the one or more parameters based at least in part on the QoS flow associated with the application traffic.

25. The method of claim 24, wherein the indication of the QoS flow comprises:
a QoS flow indicator (QFI) associated with the QoS flow.

26. A method of wireless communication performed by an application server, comprising:
providing, to a user equipment (UE) or a network controller, an indication of a traffic pattern associated with application traffic;
receiving, from the UE or the network controller, an indication of at least one of:
a discontinuous reception (DRX) configuration associated with the UE,
wherein the DRX configuration is to synchronize the traffic pattern with a DRX cycle of the UE or to synchronize the DRX cycle of the UE with the traffic pattern, or
a semipersistent scheduling (SPS) configuration associated with the UE,
wherein the SPS configuration is to synchronize the traffic pattern with an SPS cycle of the UE; and
adjusting, based at least in part on at least one of the DRX configuration or the SPS configuration, the traffic pattern to be transmitted to the UE.

27. The method of claim 26, wherein the application traffic is periodic, non time sensitive communication (non-TSC), and is not carried over a guaranteed bit rate (GBR) quality of service (QoS) flow.

28. The method of claim 26, wherein adjusting the traffic pattern comprises at least one of:
adjusting a traffic cycle associated with the application traffic,
adjusting a traffic burst size associated with the application traffic, or
adjusting a starting time of the application traffic.

29. The method of claim 26, further comprising:
receiving an indication of at least one of:
a downlink traffic offset between the application server and the UE, or
an uplink traffic offset between the application server and the UE.

30. The method of claim 29, wherein adjusting the traffic pattern associated with the application traffic comprises:
adjusting the traffic pattern based at least in part on at least one of the downlink traffic offset or the uplink traffic offset.

31. The method of claim 1, wherein the one or more parameters are for the DRX configuration, and
wherein the one or more parameters are configured to synchronize the traffic pattern with the DRX cycle of the UE.

32. The method of claim 1, wherein the one or more parameters are for the DRX configuration, and
  wherein the one or more parameters are configured to synchronize the DRX cycle of the UE with the traffic pattern.

33. The method of claim 1, wherein the one or more parameters are for the SPS configuration, and
  wherein the one or more parameters are configured to synchronize the traffic pattern with the SPS cycle of the UE.

* * * * *